(12) United States Patent
Ooto

(10) Patent No.: US 7,664,002 B2
(45) Date of Patent: Feb. 16, 2010

(54) LAMINATED WAVE PLATE AND OPTICAL PICKUP USING THE SAME

(75) Inventor: Masayuki Ooto, Samukawa-machi (JP)

(73) Assignee: Epson Toyocom Corporation, Tokyo (JP)

(*) Notice: Subject to any disclaimer, the term of this patent is extended or adjusted under 35 U.S.C. 154(b) by 0 days.

(21) Appl. No.: 12/001,392

(22) Filed: Dec. 11, 2007

(65) Prior Publication Data

US 2008/0180799 A1 Jul. 31, 2008

Related U.S. Application Data

(62) Division of application No. 10/512,698, filed as application No. PCT/JP03/05257 on Apr. 24, 2003, now Pat. No. 7,352,678.

(30) Foreign Application Priority Data

Apr. 26, 2002 (JP) .............................. 2002-126655

(51) Int. Cl.
  *G02B 5/30* (2006.01)
(52) U.S. Cl. ............................ 369/112.19; 369/112.02; 359/483
(58) Field of Classification Search .................. None
  See application file for complete search history.

(56) References Cited

U.S. PATENT DOCUMENTS

| | | | |
|---|---|---|---|
| 5,327,270 A * | 7/1994 | Miyatake | 349/9 |
| 5,579,138 A * | 11/1996 | Sannohe et al. | 349/96 |
| 6,504,811 B1 * | 1/2003 | Morimoto | 369/110.03 |
| 6,580,674 B1 | 6/2003 | Nishiyama et al. | |

(Continued)

FOREIGN PATENT DOCUMENTS

EP 0 916 989 5/1999

(Continued)

OTHER PUBLICATIONS

J.M. Beckers, "Achromatic Linear Retarders", Apr. 1971, *Applied Optics*, vol. 10, No. 4, pp. 973-975.

*Primary Examiner*—Wayne R Young
*Assistant Examiner*—Van N Chow
(74) *Attorney, Agent, or Firm*—William L. Androlia; H. Henry Koda

(57) ABSTRACT

A conventional broadband quarter-wave plate has not completely solved the wavelength dependence and has different efficiencies of shifting the phase by 90° depending on the wavelengths, and therefore has a problem that it cannot fulfill the strict specifications on the optical characteristics which are demanded of a wave plate from a viewpoint of the optical efficiency and the like in an optical pickup device compatible with a plurality of different wavelengths. To provide a wave plate which completely functions as a quarter-wave plate with respect to a plurality of different wavelengths and an optical pickup using that wave plate to solve the problem, the present invention provides a laminated wave plate, wherein a wave plate with a phase difference $\alpha$ and a wave plate with a phase difference $\beta$ with respect to monochromatic light with a wavelength $\lambda$ are laminated in such a way that directions of optical axes of said plates intersect each other, so that the laminated wave plate, as a whole, functions as a quarter-wave plate, and which is characterized in that a relationship between the $\alpha$ and the $\beta$ satisfies the following formulas:

$$(3/2) \times \pi \neq \alpha - 2 \times \pi \times (m-1)$$

$$\pi \neq \beta - 2 \times \pi \times (n-1),$$

wherein: each of m and n is a positive integer.

18 Claims, 17 Drawing Sheets

U.S. PATENT DOCUMENTS

| | | |
|---|---|---|
| 6,873,588 B1 | 3/2005 | Mizuno et al. |
| 6,917,576 B2 | 7/2005 | Nishiyama et al. |
| 2002/0159007 A1* | 10/2002 | Suzuki et al. ............... 349/102 |
| 2003/0123371 A1 | 7/2003 | Nishiyama et al. |
| 2004/0114494 A1* | 6/2004 | Mizuno et al. ......... 369/112.17 |
| 2004/0120044 A1* | 6/2004 | Kreuzer ...................... 359/499 |
| 2004/0165518 A1 | 8/2004 | Horimai et al. |
| 2004/0208111 A1* | 10/2004 | Hayashi et al. ........ 369/112.26 |
| 2004/0257961 A1 | 12/2004 | Nishi et al. |

FOREIGN PATENT DOCUMENTS

| | | |
|---|---|---|
| EP | 1 126 291 | 8/2001 |
| JP | 3174367 | 4/1993 |
| JP | 10-68816 | 3/1998 |
| JP | 10-068816 | 3/1998 |
| JP | 10-177737 | 6/1998 |
| JP | 10-214431 | 8/1998 |
| JP | 2000-276766 | 10/2000 |
| JP | 2002-276766 | 10/2000 |
| JP | 2001-4841 | 1/2001 |
| JP | 2001-101700 | 4/2001 |
| JP | 2001-184695 | 7/2001 |
| JP | 2001-307368 | 11/2001 |
| JP | 2001-344800 | 12/2001 |
| JP | 2002-14228 | 1/2002 |
| JP | 2002-117571 | 4/2002 |
| WO | WO 01/16627 | 3/2001 |

* cited by examiner (a)

(b)

(a)

(b)

(a)

(b)

(a)

(b)

(c)

|  | 655 nm | 785 nm |
|---|---|---|
| Wave Plate 30 | 2700° | 2257° |
|  | 360×7+180 | 360×6+100 |
| Wave Plate 31 | 630° | 527° |
|  | 360×1+270 | 360×1+167 |

(a)

(b)

(a)

(b)

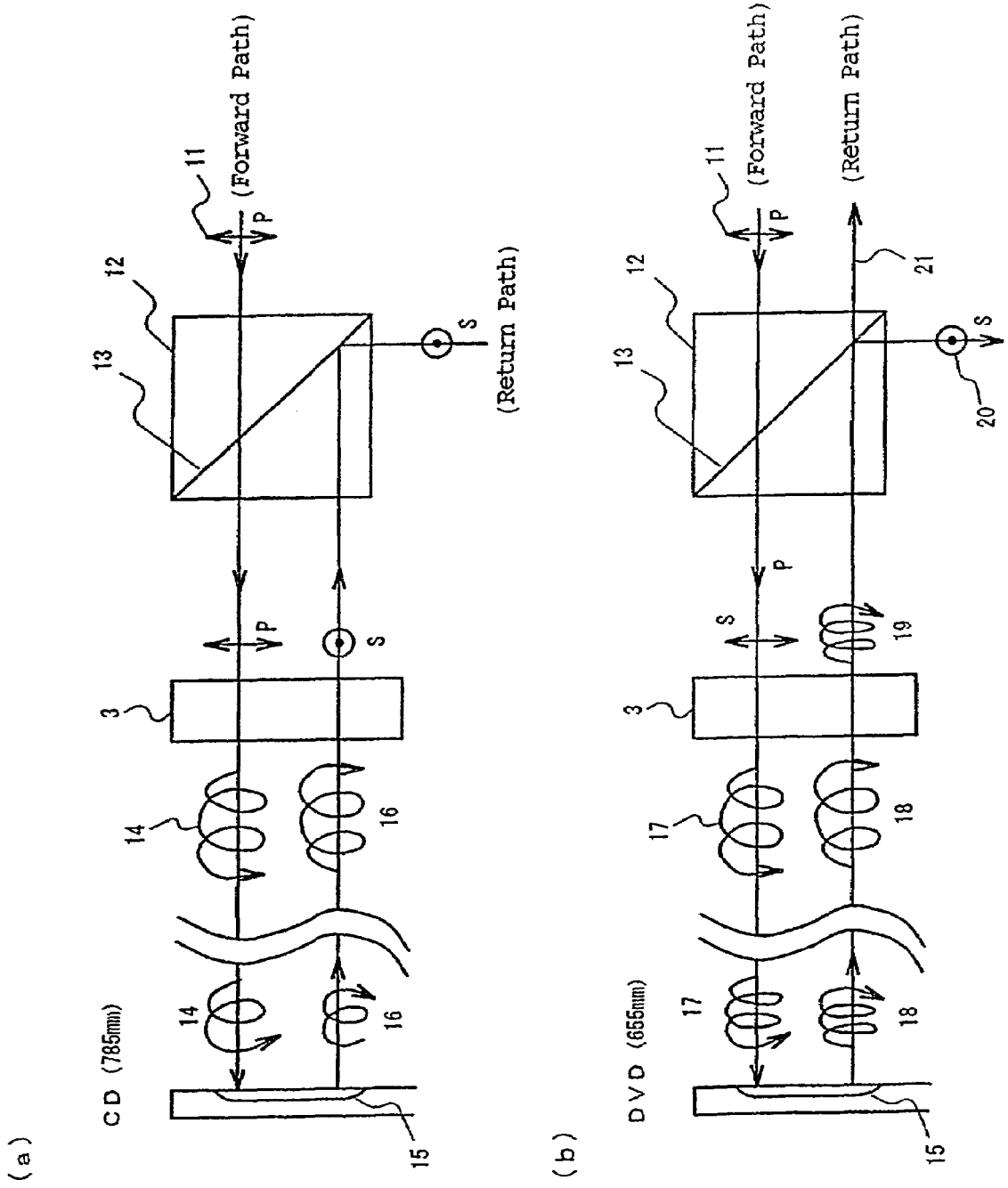

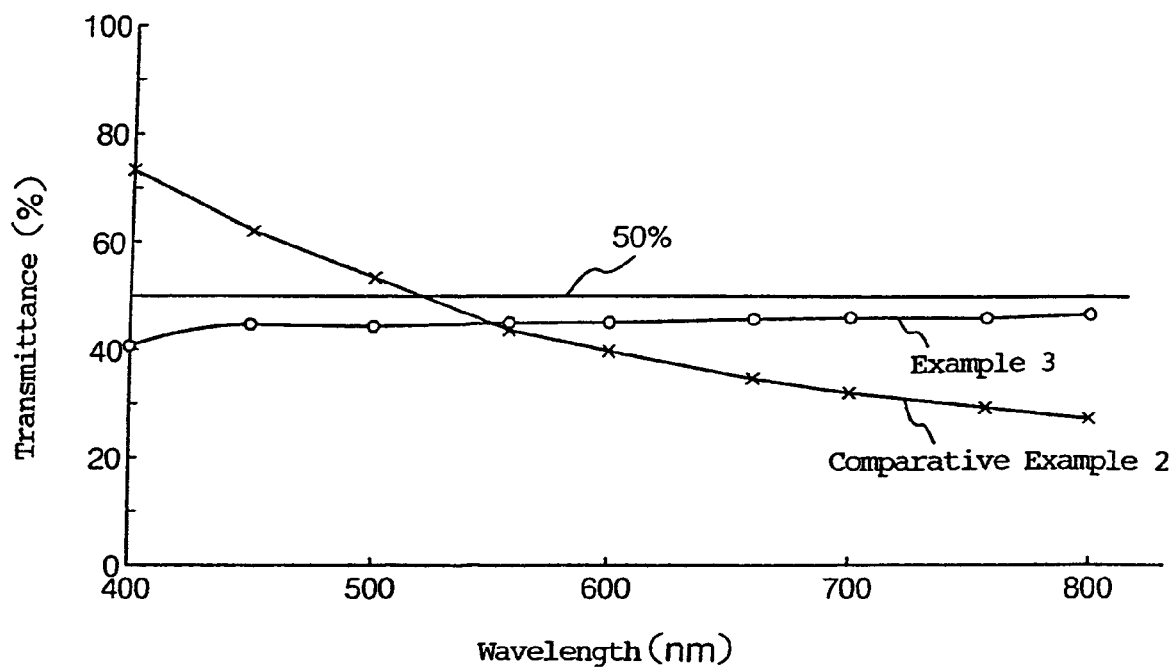

LAMINATED WAVE PLATE AND OPTICAL PICKUP USING THE SAME

This is a Divisional Application of application Ser. No. 10/512,698, filed Oct. 25, 2004, which is hereby incorporated in its entirety by reference.

TECHNICAL FIELD

The present invention relates generally to a laminated wave plate which can ensure recording and playback of information to and from an optical recording medium using lights with different wavelengths, and in particular to an optical pickup using the same.

BACKGROUND ART

Optical disc device which perform recording and playback of information with respect to CD, DVD, and the like which are optical recording mediums for the information on music and videos, using laser light, such as linearly polarized light and circularly polarized light, is widely used. As an optical pickup device among them, which is compatible with CD and DVD, is popularized, there is a growing demand for miniaturization of the device, and attempts have been made to miniaturize the optical pickup device by simplification, such as reducing the number of optical elements.

A DVD is so designed as to be able to retain video and audio information of over two hours in a single disc, and has a higher recording density than a CD, so that the playback wavelength of the DVD becomes shorter to 655 nm as compared with 785 nm for the CD. An optical pickup device compatible with the DVD and CD inevitably requires two different wavelengths, two laser light sources to cope with the two wavelengths, and respective sets of optical elements, such as wave plates. As a result, the optical pickup device is composed of two pickups. With the recent demand for miniaturization of the optical pickup device, however, various attempts have been made to construct the device with a single pickup.

Polarized light used in an optical pickup will be described below. Light is one of waves which is called an electromagnetic wave. A plane which includes the progressing direction of light and a magnetic field vector is called a plane of polarization. A plane which includes the progressing direction of light and an electric field vector is called a plane of vibration. Light in which the directions of planes of polarization are the same is called polarized light. Further, polarized light whose plane of polarization is limited to a single plane is called linearly polarized light that includes P-polarized light, a component which vibrates horizontally with respect to a plane including an incident light and line normal to an incident plane, and S-polarized light, a component which vibrates vertically with respect to a plane including the incident light and line normal to the incident plane.

Polarized light whose electric field vector rotates with the passage of time as seen at a given position is generally called elliptically polarized light, and particularly, when the distal end of electric field vector is projected on a plane perpendicular to the progressing direction of light, the one whose locus is a circle is called circularly polarized light.

FIG. 14 is a diagram showing a zero-order wave plate 3 which is constructed by laminating a first multiple-order wave plate 1 (thickness d1) with a phase difference δ1 (2790°) and a second multiple-order wave plate 2 (thickness d2) with a phase difference δ2 (2700°) in such a way that the crystal optical axes cross each other at 90°, and functions as a quarter-wave plate. FIG. 14(a) is a diagram showing the angle of intersection of crystal optical axes 4 and 5 of the first and second wave plates 1 and 2 as seen from the incident plane of the wave plate 3, and FIG. 14(b) is a perspective view showing the configuration of the wave plate 3.

This can cancel out an extra phase difference by setting the angle of intersection of the crystal optical axes to 90°, i.e., δ1−2=2790°−2700°=90°, and functions as a zero-order quarter-wave plate. Therefore, as the linearly polarized light 6 enters the wave plate 3, the phase is shifted by 90° at the emergence plane so that it is output as circularly polarized light 7.

The phase difference δ3 of the wave plate 3 can also be given by the following formula.

$$\delta 3 = \delta 1 - \delta 2 = 2\pi \times \Delta n \times (d1 - d2)/\lambda \tag{1}$$

wherein: Δn is a refractive index difference between the first and second wave plates 1 and 2, and λ is the wavelength of incident light.

FIG. 15 is a perspective view showing a zero-order wave plate 8 (thickness d3) which functions as a zero-order quarter-wave plate with a phase difference δ4 (=90°). As a linearly polarized light 9 enters the wave plate 8, the phase is shifted by 90° at the emergence plane so that it is output as circularly polarized light 10.

The phase difference δ4 of the wave plate 8 can be given by the following formula.

$$\delta 4 = 2\pi \times \Delta n \times d3/\lambda \tag{2}$$

wherein: Δn is a refractive index difference (Ne−No) of the wave plate 8, λ is the wavelength of incident light, No is the refractive index of ordinary ray, and Ne is the refractive index of extraordinary ray.

The following problem arises when an attempt is made to construct a 2 different wavelength optical pickup device with a single pickup by adequately selecting those wave plates 3 and 8 and arranging them at predetermined positions in the pickup.

When a pickup is constructed in such a way that the single quarter-wave plate 3 for playback of a CD (785 nm) as shown in FIG. 16 copes with two different wavelengths in order to reduce the number of elements to miniaturize the optical pickup device as mentioned above, as shown in FIG. 16(a), as P-polarized light 11 enters a light splitter 12 (hereinafter, "PBS"), it passes a mirror 13 which is formed by an optical thin film having characteristics to pass P-polarized light and reflect S-polarized light, and enters the quarter-wave plate 3 as P-polarized light. As the phase is shifted by 90° here, the light is output as circularly polarized light 14 and is input to a pit 15 of the CD. At the time the circularly polarized light 14 is reflected at the pit 15, it is reflected as circularly polarized light 16 with the opposite rotational direction, so that when the circularly polarized light 16 enters the quarter-wave plate 3, it is output as S-polarized light, is reflected at the mirror 13 of the PBS 12 and reaches a photodetector (hereinafter, "PD") not shown, thereby ensuring the use of the laser light with efficiency of 90% or more. For the sake of easier description, the optical axis is shifted between a forward path and a return path in FIG. 16.

In a case of playing back a DVD, on the other hand, as shown in FIG. 16(b), when P-polarized light 11 with a wavelength of 655 nm enters the PBS 12, it passes the mirror 13 and enters a quarter-wave plate 3 as the P-polarized light. At this time, the quarter-wave plate 3 has a function of shifting the phase by 90° only with respect to a single wavelength of 785 nm, so that conversion from linearly polarized light to circularly polarized light cannot be carried out sufficiently and the light is output as elliptically polarized light 17. When this light enters the pit 15 of the DVD, it is reflected as elliptically polarized light 18 whose rotational direction is opposite to that of the elliptically polarized light 17 and is input to the quarter-wave plate 3. Likewise, it cannot be sufficiently converted to linearly polarized light, i.e., it is output from the quarter-wave plate 3 in a state where an elliptically polarized light component and an S-polarized light component are mixed, and the S-polarized light component alone is reflected at the mirror 13 of the PBS 12 while the elliptically polarized light component passes the mirror 13. Therefore, from the results of the experiments conducted by the present inventor, for example, about 65% of laser light is detected by a PD from the viewpoint of the optical efficiency, and remaining about 30% is lost as an elliptically polarized light component which passes the mirror, raising a problem in view of efficiency. This is also seen from the formulas (1) and (2) representing the phase differences of the wave plates 3 and 8 and showing that the phase differences depend on the wavelength.

Japanese Patent No. 3174367 proposes a broadband quarter-wave plate wherein a laminated wave plate, constructed by laminating an extension film having a phase difference of a half wavelength (180°) with respect to monochromatic light and an extension film having a phase difference of a quarter wavelength (90°) in such a way that those crystal optical axes cross each other, has a function of shifting the phase by 90° in a wide band. When the broadband quarter-wave plate is used in an optical pickup device which records and plays back a DVD (655 nm) and CD (785 nm), a single wave plate copes with two wavelengths, so that the demand of simplifying pickups to nearly a single one can be satisfied.

As shown in FIG. 17, FIG. 5 of Japanese Patent No. 3174367 discloses a graph of the wavelength dependence of transmittance obtained by evaluating the spectrum with the broadband quarter-wave plate placed between polarization plates laid out in the crossed nicols arrangement.

Paying attention to the curve of Example 3 in the graph or the transmittance of the broadband quarter-wave plate, however, the transmittance gradually increases from 40% to 50% as the wavelength moves from 400 nm to 800 nm, i.e., the graph has an inclined characteristic. It is apparent that the efficiency of the function as a quarter-wave plate changes according to the wavelength. It is the transmittance of 50% at which the wave plate completely functions as a quarter-wave plate. That is, this broadband quarter-wave plate has not solved the wavelength dependence completely and has different efficiencies of shifting the phase by 90° depending on the wavelengths, and therefore has a problem that it cannot fulfill the strict specifications on the optical characteristics which are demanded of a wave plate from a viewpoint of the optical efficiency or the like in a recent optical pickup device which is compatible with a DVD/CD.

The present invention has been achieved in order to overcome the above problem and aims at providing a wave plate that completely functions as a quarter-wave plate with respect to a plurality of wavelengths in an optical pickup device or the like which is compatible with a DVD/CD, and an optical pickup using the wave plate.

DISCLOSURE OF THE INVENTION

To solve the above problem, the invention according to claim 1 provides a laminated quarter-wave plate, comprising: a first wave plate with a phase difference $\alpha$ with respect to monochromatic light with a wavelength $\lambda$; and a second wave plate with a phase difference $\beta$ with respect to monochromatic light with a wavelength $\lambda$ laminated on said first wave plate, in such a way that directions of optical axes of said plates intersect each other; characterized in that each of said $\alpha$ and said $\beta$ satisfies the following formulas:

$$(3/2) \times \pi \neq \alpha - 2 \times \pi \times (m-1)$$

$$\pi \neq \beta - 2 \times \pi \times (n-1),$$

wherein: each of m and n is a positive integer.

The present invention according to claim 2 is an optical pickup device comprising: a laser light source for emitting laser light having two different wavelengths, a laminated quarter-wave plate located in an optical path from the laser light source to an optical medium, or an optical path from the optical medium to the photodetector; wherein said laminated quarter-wave plate having such structure that a first wave plate with a phase difference $\alpha$ with respect to monochromatic light with a wavelength $\lambda$ and a second wave plate with a phase difference $\beta$ with respect to monochromatic light with a wavelength $\lambda$ laminate, in such a way that directions of optical axes of said plates intersect each other; characterized in that each of said $\alpha$ and said $\beta$ satisfies the following formulas:

$$(3/2) \times \pi \neq \alpha - 2 \times \pi \times (m-1)$$

$$\pi \neq \beta - 2 \times \pi \times (n-1)$$

wherein: each of m and n is a positive integer.

The present invention according to claim 3 is an optical pickup device wherein said two different wavelengths comprise 655 nm and 785 nm.

The present invention according to claim 4 is a laminated wave plate comprising: a wave plate A having a phase difference of 1695° with respect to a wavelength of 785 nm; and a wave plate B having a phase difference of 850° with respect to a wavelength of 785 nm laminated on said wave plate A, in such a way that directions of optical axes of said plates intersect each other.

The present invention according to claim 5 is a laminated wave plate wherein said laminated wave plate functions as a quarter-wave plate with respect to wavelengths of 655 nm and 785 nm.

The present invention according to claim 6 is a laminated wave plate comprising: a wave plate C having a phase difference of 2700° with respect to a wavelength of 655 nm; and a wave plate D having a phase difference of 630° with respect to a wavelength of 655 nm, in such a way that directions of optical axes of said plates intersect each other.

The present invention according to claim 7 is a laminated wave plate characterized in that claim 6, wherein said laminated wave plate functions as a quarter-wave plate with respect to a wavelength of 655 nm and functions as a half-wave plate with respect to a wavelength of 785 nm.

The present invention according to claim 8 is a laminated wave plate comprising: a wave plate E having a phase difference of 2700° with respect to a wavelength of 655 nm; and a wave plate F having a phase difference of 1260° with respect to a wavelength of 655 nm, in such a way that directions of optical axes of said plates intersect each other.

The present invention according to claim 9 is a laminated wave plate wherein said laminated wave plate functions as a half-wave plate with respect to a wavelength of 655 nm and functions as a 2/2 wave plate with respect to a wavelength of 785 nm.

The present invention according to claim 10 is an optical pickup device comprising: a laser light source for emitting laser light having two different wavelengths, wherein said laser light source emits a first linearly polarized light with a wavelength of 655 nm and a second linearly polarized light with a wavelength of 785 nm; and a first laminated quarter-wave plate and second wave plate located in an optical path from the laser light source to an optical medium, or an optical path from the optical medium to the photodetector; wherein said first wave plate having such structure that a wave plate C having a phase difference of 2700° and a wave plate D having a phase difference of 1260° with respect to a wavelength of 655 nm laminate, in such a way that directions of optical axes of said plates intersect each other; and said second wave plate having such structure that a wave plate A having a phase difference of 1695° and a wave plate B having a phase difference of 850° with respect to a wavelength of 785 nm laminate in such a way that directions of optical axes of said plates intersect each other.

The present invention according to claim 11 is an optical pickup device comprising: a laser light source for emitting laser light having two different wavelengths, wherein said laser light source emits a first linearly polarized light with a wavelength of 655 nm and a second linearly polarized light with a wavelength of 785 nm; and a first laminated quarter-wave plate and second wave plate located in an optical path from the laser light source to an optical medium, or an optical path from the optical medium to the photodetector; wherein said first wave plate having such structure that a wave plate C having a phase difference of 2700° and a wave plate D having a phase difference of 630° with respect to a wavelength of 655 nm laminate, in such a way that directions of optical axes of said plates intersect each other.

The present invention according to claim 12 is a laminated quarter-wave plate comprising: a first wave plate with a phase difference α with respect to monochromatic light with a wavelength λ; and a second wave plate with a phase difference β with respect to monochromatic light with a wavelength λ laminated on said first wave plate, in such a way that directions of optical axes of said plates intersect each other; characterized in that each of said α and said β satisfies the following formulas:

$$\pi = \alpha - 2 \times \pi \times (m-1)$$

$$(3/2) \times \pi = \beta - 2 \times \pi \times (n-1),$$

wherein: each of m and n is a positive integer.

The present invention according to claim 13 is an optical pickup device comprising: a laser light source for emitting laser light having two different wavelengths, a laminated quarter-wave plate located in an optical path from the laser light source to an optical medium, or an optical path from the optical medium to the photodetector; wherein said laminated quarter-wave plate having such structure that a first wave plate with a phase difference α with respect to monochromatic light with a wavelength λ and a second wave plate with a phase difference β with respect to monochromatic light with a wavelength λ laminate, in such a way that directions of optical axes of said plates intersect each other; characterized in that each of said α and said β satisfies the following formulas:

$$\pi = \alpha - 2 \times \pi \times (m-1)$$

$$(3/2) \times \pi = \beta - 2 \times \pi \times (n-1),$$

wherein: each of m and n is a positive integer.

The present invention according to claim 14 is an optical pickup device characterized in that claim 13, wherein said two different wavelengths comprise 655 nm and 785 nm.

The present invention according to claim 15 is a laminated wave plate comprising: a wave plate A having a phase difference of 1980° with respect to a wavelength of 785 nm or 655 nm; and a wave plate B having a phase difference of 990° with respect to a wavelength of 785 nm or 655 nm, in such a way that directions of optical axes of said plates intersect each other.

The present invention according to claim 16 is a laminated wave plate wherein said laminated wave plate functions as a quarter-wave plate with respect to a wavelength of 655 nm and 785 nm.

The present invention according to claim 17 is an optical pickup device comprising: a laser light source for emitting laser light having two different wavelengths, wherein said laser light source emits a first linearly polarized light with a wavelength of 655 nm and a second linearly polarized light with a wavelength of 785 nm; and a first laminated quarter-wave plate and second wave plate located in an optical path from the laser light source to an optical medium, or an optical path from the optical medium to the photodetector; wherein said first wave plate having such structure that a wave plate C having a phase difference of 2700° and a wave plate D having a phase difference of 1260° with respect to a wavelength of 655 nm laminate, in such a way that directions of optical axes of said plates intersect each other; and said second wave plate having such structure that a wave plate A having a phase difference of 1980° and a wave plate B having a phase difference of 990° with respect to a wavelength of 785 nm laminate in such a way that directions of optical axes of said plates intersect each other.

BRIEF DESCRIPTION OF THE DRAWINGS

FIG. 1 is a diagram for explaining the configuration of a first embodiment of a laminated wave plate according to the present invention, in which FIG. 1(a) is a plan view of the wave plate as seen from the incident direction, and FIG. 1(b) is a schematic perspective view of the wave plate.

FIG. 2 is a diagram for showing the characteristics of the first embodiment of the laminated wave plate according to the present invention, in which FIG. 2(a) is a diagram for showing the relationship between a wavelength and a phase difference, and FIG. 2(b) is a diagram for showing the transmittance characteristic of crossed nicols.

FIG. 3 is a diagram for explaining the configuration of a second embodiment of the laminated wave plate according to the present invention, in which FIG. 3(a) is a plan view as seen from the incident direction, and FIG. 3(b) is a schematic perspective view.

FIG. 5 is a diagram for showing a first modification of the laminated wave plate according to the present invention, in which FIG. 5(a) is a plan view as seen from the incident direction, FIG. 5(b) is a schematic perspective view, and FIG. 5(c) is a table for showing the individual phase differences of wave plates to be laminated.

FIG. 7 is a diagram for showing a second modification of the laminated wave plate according to the present invention, in which FIG. 7(a) is a plan view as seen from the incident direction, and FIG. 7(b) is a schematic perspective view.

FIG. 14 is a diagram for showing a conventional laminated wave plate, in which FIG. 14(a) is a plan view as seen from the incident direction, and FIG. 14(b) is a schematic perspective view.

FIGS. 16(a) and 16(b) are plan views for explaining the optical action of a conventional optical pickup.

FIG. 17 is a graph for showing the transmittance of crossed nicols of a conventional broadband wave plate.

BEST MODE FOR CARRYING OUT THE INVENTION

Figure 1:
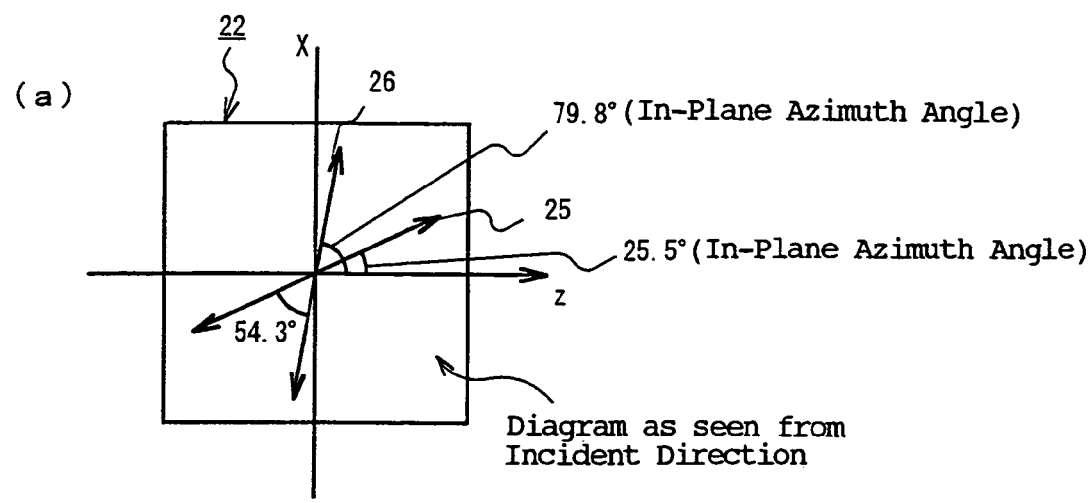
Figure 1:
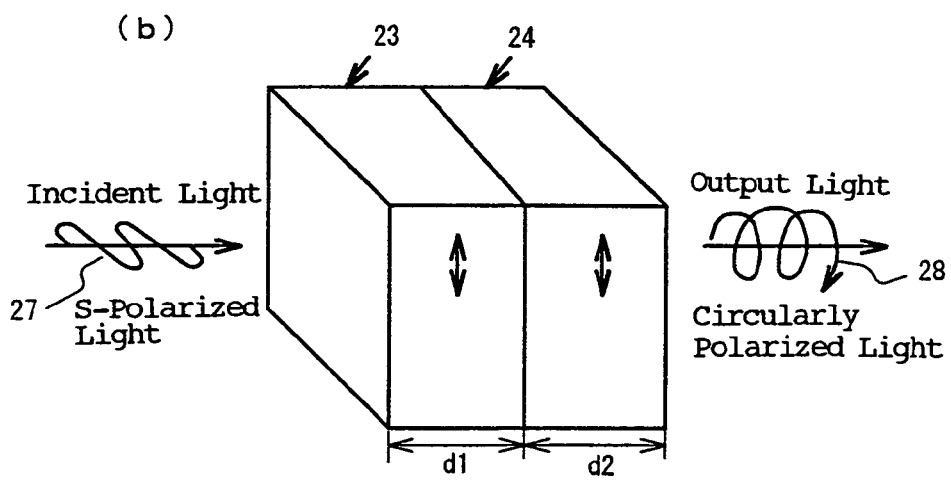

The present invention is explained below in detail with reference to the embodiments shown in the drawings.

FIG. 1 is a diagram for showing the configuration of a first embodiment of a wave plate according to the present invention, in which FIG. 1(a) is a plan view of the wave plate as seen from the incident direction, and FIG. 1(b) is a schematic perspective view of the wave plate. This wave plate 22 is a laminated wave plate, wherein a quartz crystal wave plate 23 with a phase difference of 1695° (fourth-order 255°) with respect to a wavelength of 785 nm and with an in-plane rotational direction (hereinafter, "in-plane azimuth angle") of 25.5°, and a quartz crystal wave plate 24 with a phase difference of 850° (second-order 130°) and with an in-plane azimuth angle of 79.8° are laminated together in such a way that those crystal optical axes 25 and 26 cross each other at an angle of 54.3°, and which, as a whole, functions as a quarter-wave plate at wavelengths of 655 nm and 785 nm. That is, as linearly polarized light 27 enters the laminated wave plate 22, the phase is shifted by 90° at the emergence plane so that it is output as circularly polarized light 28.

A detailed description will be given of how the optical characteristics of the laminated quartz crystal wave plates 23 and 24 to allow the laminated wave plate 22 to function as a quarter-wave plate are computed.

In the computation of numerals, a Mueller matrix is used hereinafter to show the individual polarization states.

Here, the phase difference and the in-plane azimuth angle of the wave plate 23 are given by $\delta 1$ and $\theta 1$, and the phase difference and the in-plane azimuth angle of the wave plate 24 are given by $\delta 2$ and $\theta 2$. $\delta 1$ and $\delta 2$ can be given by the following formulas (3) and (4).

$$\delta 1 = 2 \times \pi / \lambda \times (Ne - No) \times d1 \tag{3}$$

$$\delta 2 = 2 \times \pi / \lambda \times (Ne - No) \times d2 \tag{4}$$

wherein: $\lambda$ is the wavelength, No is the refractive index of normal ray, Ne is the refractive index of abnormal ray, d1 is the thickness of the quartz crystal wave plate 23, and d2 is the thickness of the quartz crystal wave plate 24.

A Mueller matrix A1 of the wave plate 23 can be given by the following formula (5).

$$A_1 = \begin{bmatrix} 1 & 0 & 0 & 0 \\ 0 & 1-(1-\cos\delta_1)\sin^2 2\theta_1 & (1-\cos\delta_1)\sin 2\theta_1 \cos 2\theta_1 & -\sin\delta_1 \sin 2\theta_1 \\ 0 & (1-\cos\delta_1)\sin 2\theta_1 \cos 2\theta_1 & 1-(1-\cos\delta_1)\cos^2 2\theta_1 & \sin\delta_1 \cos 2\theta_1 \\ 0 & \sin\delta_1 \sin 2\theta_1 & -\sin\delta_1 \cos 2\theta_1 & \cos\delta_1 \end{bmatrix} \tag{5}$$

A Mueller matrix A2 of the wave plate 24 can be given by the following formula (6).

$$A_2 = \begin{bmatrix} 1 & 0 & 0 & 0 \\ 0 & 1-(1-\cos\delta_2)\sin^2 2\theta_2 & (1-\cos\delta_2)\sin 2\theta_2 \cos 2\theta_2 & -\sin\delta_2 \sin 2\theta_2 \\ 0 & (1-\cos\delta_2)\sin 2\theta_2 \cos 2\theta_2 & 1-(1-\cos\delta_2)\cos^2 2\theta_2 & \sin\delta_2 \cos 2\theta_2 \\ 0 & \sin\delta_2 \sin 2\theta_2 & -\sin\delta_2 \cos 2\theta_2 & \cos\delta_2 \end{bmatrix} \tag{6}$$

The state of incident polarized light input to the laminated wave plate 22 is expressed by a Stokes vector T in the following formula (7).

$$T = \begin{bmatrix} t_1 \\ t_2 \\ t_3 \\ t_4 \end{bmatrix} \tag{7}$$

The state of emitted polarized light output from the laminated wave plate 22 is expressed by a Stokes vector S in the following formula (8).

$$S = \begin{bmatrix} S_1 \\ S_2 \\ S_3 \\ S_4 \end{bmatrix} \quad (8)$$

A Mueller matrix in the following formula (9) is derived from the formulas (5) to (8).

$$\begin{bmatrix} S_1 \\ S_2 \\ S_3 \\ S_4 \end{bmatrix} = A_2 \cdot A_1 \begin{bmatrix} t_1 \\ t_2 \\ t_3 \\ t_4 \end{bmatrix} \quad (9)$$

In the formula (9), if T is in the following state of the incident polarized light, it is $$T = \begin{bmatrix} t_1 \\ t_2 \\ t_3 \\ t_4 \end{bmatrix} = \begin{bmatrix} 1 \\ 1 \\ 0 \\ 0 \end{bmatrix} \quad (10)$$

$$S = A_2 \cdot A_1 \begin{bmatrix} 1 \\ 1 \\ 0 \\ 0 \end{bmatrix} \quad (11)$$

The phase difference Γ of the laminated wave plate can be given by the following formula (12).

$$\Gamma = \arctan \frac{S_3}{\sqrt{S_1^2 + S_2^2}} \quad (12)$$

The simulation, therefore, has been conducted in such a way that the phase difference Γ would become $(2 \times n-1) \times (\pi/2)$ from the formulas (11) and (12) and n would become a positive integer.

Figure 2:
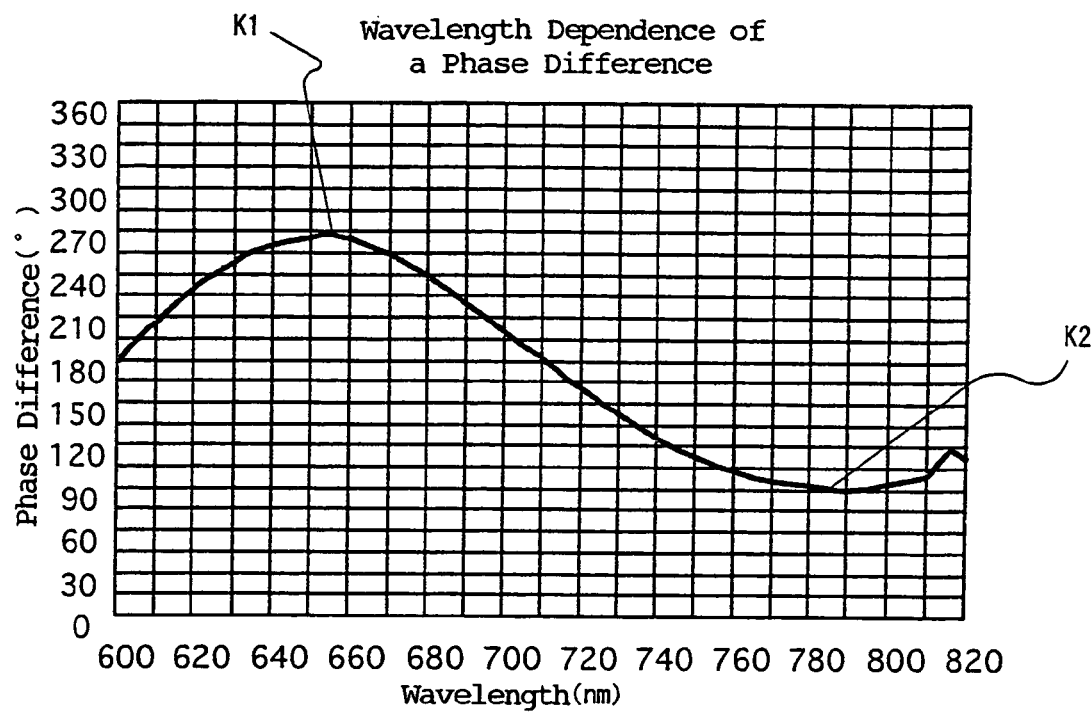
Figure 2:
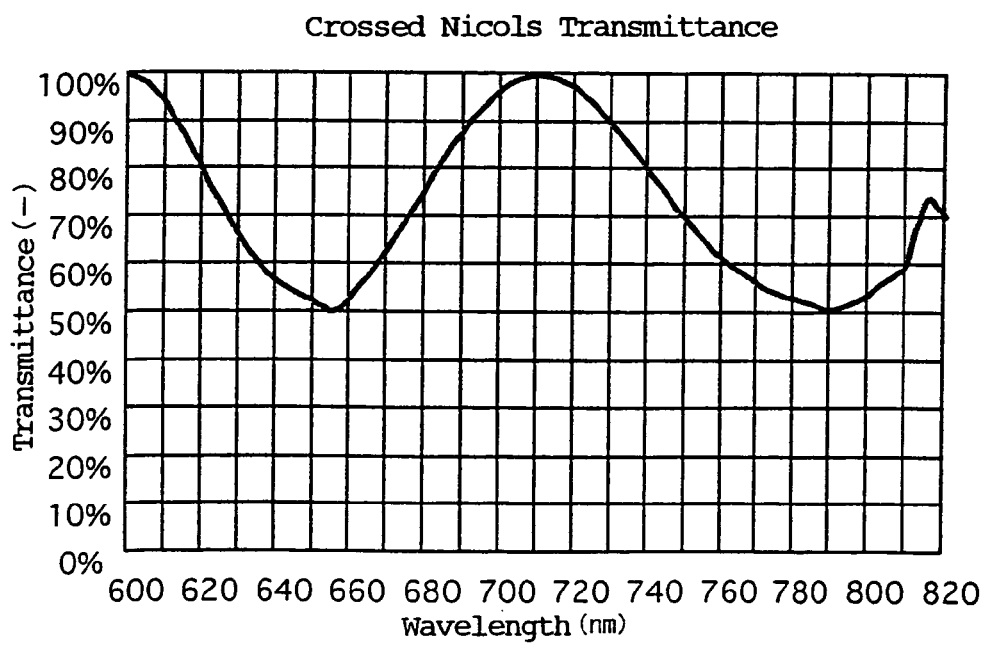

From the results of the above simulation, when the phase difference and the in-plane azimuth angle of each quartz crystal wave plate are (δ1, θ1, δ2, θ2)=(1695°, 25.5°, 850°, 79.8°), the phase difference Γ draws a phase difference-wavelength dependence curve as shown in FIG. 2(a), the phase difference becomes 270° (point K1) at the wavelength of 655 nm, the phase difference becomes 90° (point K2) at the wavelength of 785 nm, or the phase difference becomes 90° at the wavelength of 655 nm, the phase difference becomes 270° at the wavelength of 785 nm, though the curve characteristics are not shown. At both wavelengths, the laminated wave plate realized to completely function as a quarter-wave plate.

The evaluation of the spectrum of the laminated wave plate 22 placed between the polarized plates laid out in the crossed nicols arrangement shows that the spectrum draws the transmittance characteristics as shown in FIG. 2(b), and shows the transmittance of 50% at the wavelengths of 655 nm and 785 nm, proving that the laminated wave plate functions as a quarter-wave plate without error and making it possible to provide the laminated wave plate which copes with two different wavelengths, which would convert incident linearly polarized light into circularly polarized light without any loss.

As the thicknesses of the quartz crystal wave plates to be laminated are arbitrarily determined, from the formulas (3) and (4), beforehand within the range of causing no problem on the manufacture cost in numerical computation to attain a solution in the simulation, it is found from the series of processes to adequately determine the thicknesses of the individual quartz crystal wave plates with respect to predetermined plural wavelengths and obtain the laminated wave plate which functions as a quarter-wave plate, that the phase differences α and β of the quartz crystal wave plates are determined from the range which satisfies the conditions in the following two formulas.

$$(3/2) \times \pi \neq \alpha - 2 \times \pi \times (n-1) \quad (13)$$

$$\pi \neq \beta - 2 \times \pi \times (n-1) \quad (14)$$

n: positive integer, α=δ1, and β=δ2

That is, from the simulation analysis and results of the experiment according to the present invention, it is derived that the laminated wave plate which functions as a quarter-wave plate with respect to plural wavelengths is constructed by laminating quartz crystal wave plates which have phase differences (substantial phase differences excluding components of the multiple-order phase differences) shifted from 180° and 270°.

Figure 3:
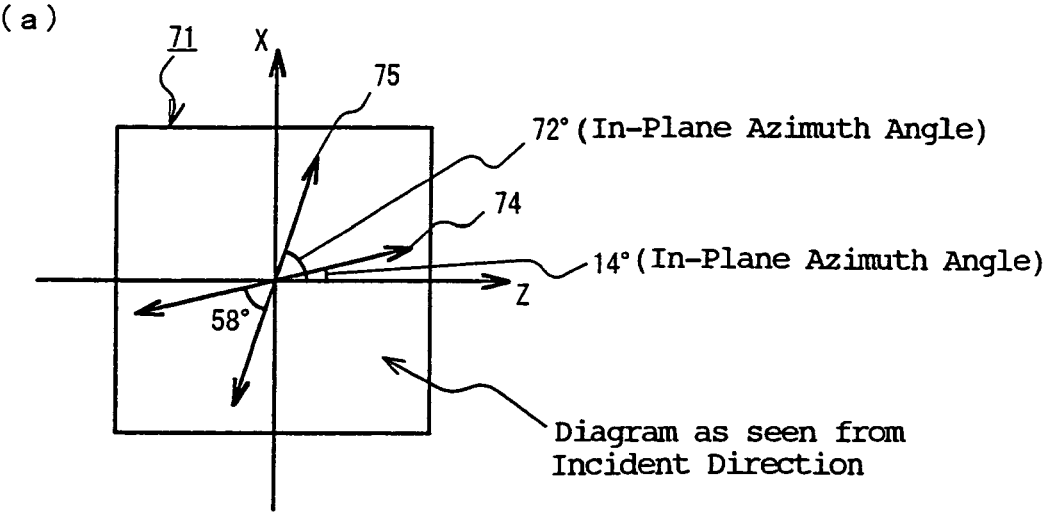
Figure 3:
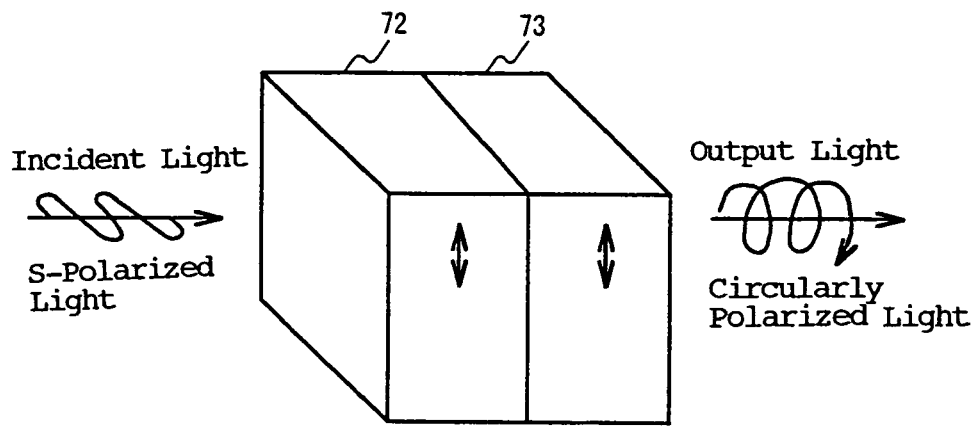

FIG. 3 is a diagram for showing the configuration of a second embodiment of a wave plate according to the present invention, in which FIG. 3(a) is a plan view of the wave plate as seen from the incident direction, and FIG. 3(b) is a schematic perspective view of the wave plate. This wave plate 71 is a laminated wave plate, wherein a quartz crystal wave plate 72 with a phase difference of 1980° (fifth-order 180°) with respect to a wavelength of 785 nm or 655 nm and an in-plane azimuth angle of 14°, and a quartz crystal wave plate 73 with a phase difference of 990° (second-order 270°) and an in-plane azimuth angle of 72° are laminated together in such a way that the crystal optical axes 74 and 75 cross each other at an angle of 58°, and which, as a whole, functions as a quarter-wave plate at the wavelengths of 655 nm and 785 nm. That is, as a linearly polarized light enters the laminated wave plate 71, the phase is shifted by 90° at the emergence plane so that it is output as a circularly polarized light.

Figure 4:
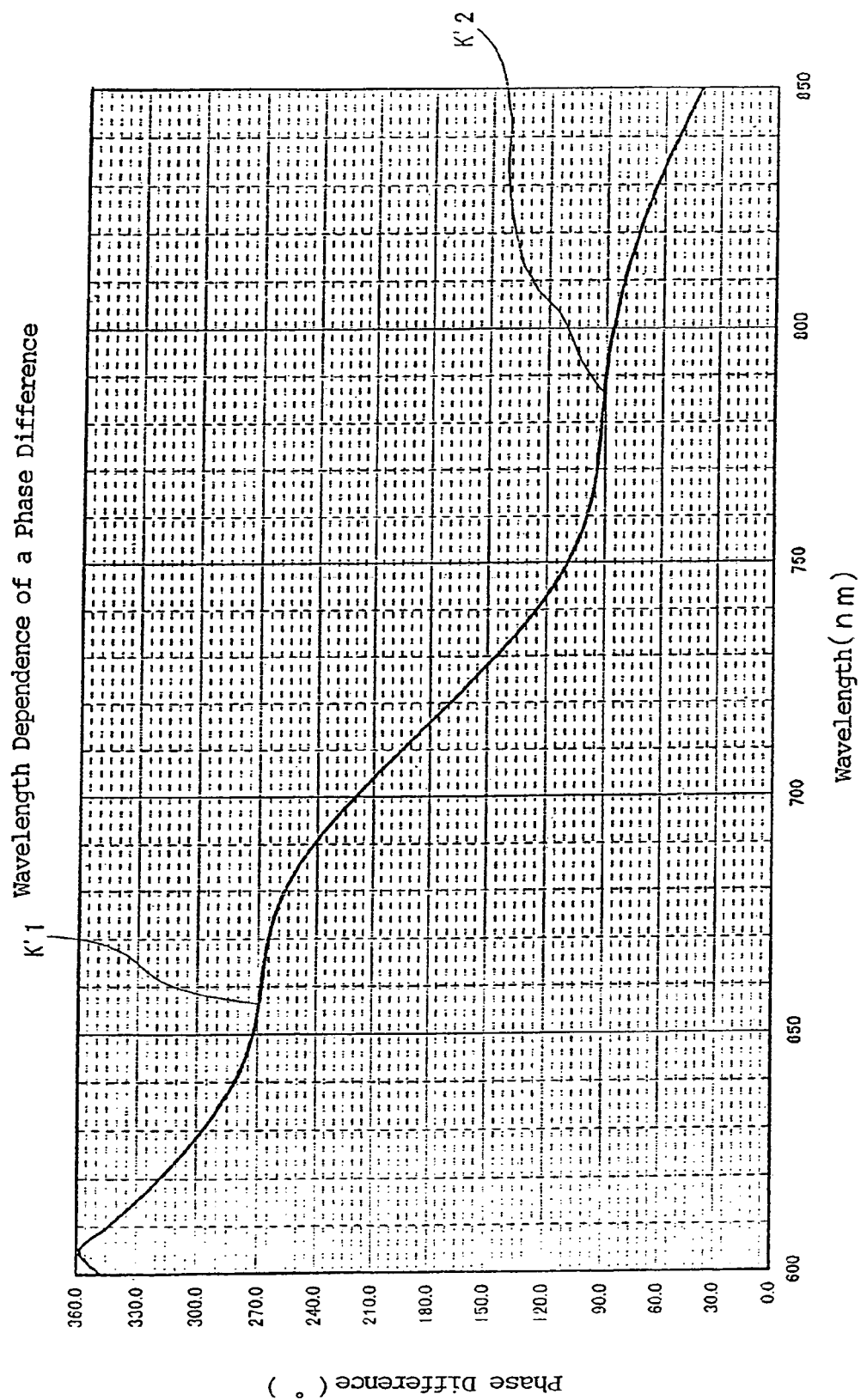
FIG. 4 is a diagram for showing the characteristics of the second embodiment of the laminated wave plate according to the present invention, and for showing the relationship between the wavelength and the phase difference.

From the results of the simulation similar to the one described above, when the phase difference and the in-plane azimuth angle of each quartz crystal wave plate are (δ1, θ1, δ2, θ2)=(1980°, 14°, 990°, 72°), the phase difference Γ of the laminated wave plate draws a wavelength dependence of the phase difference as shown in FIG. 4, the phase difference becomes 270° (point K'1) at the wavelength of 655 nm, the phase difference becomes 90° (point K'2) at the wavelength of 785 nm, or the phase difference becomes 90° at the wavelength of 655 nm, the phase difference becomes 270° at the wavelength of 785 nm, though a wavelength dependence of the phase difference is not shown. At both wavelengths, the laminated wave plate realized to completely function as a quarter-wave plate.

In this case, the phase differences α and β of the quartz crystal wave plates 72 and 73 are determined from the range which satisfies the conditions in the following formulas.

$$\pi \neq \alpha - 2 \times \pi \times (n-1) \quad (15)$$

$$(3/4) \times \pi \neq \beta - 2 \times \pi \times (n-1) \quad (16)$$

n: positive integer, α=δ1, and β=δ2

Further, if the individual wave plates are laminated with the in-plane azimuth angles having a precision of ±5° to the desired values, the wave plate sufficiently functions as a quarter-wave plate with respect to the two wavelengths, so that cost reduction can be expected even in the mass production.

Figure 5:
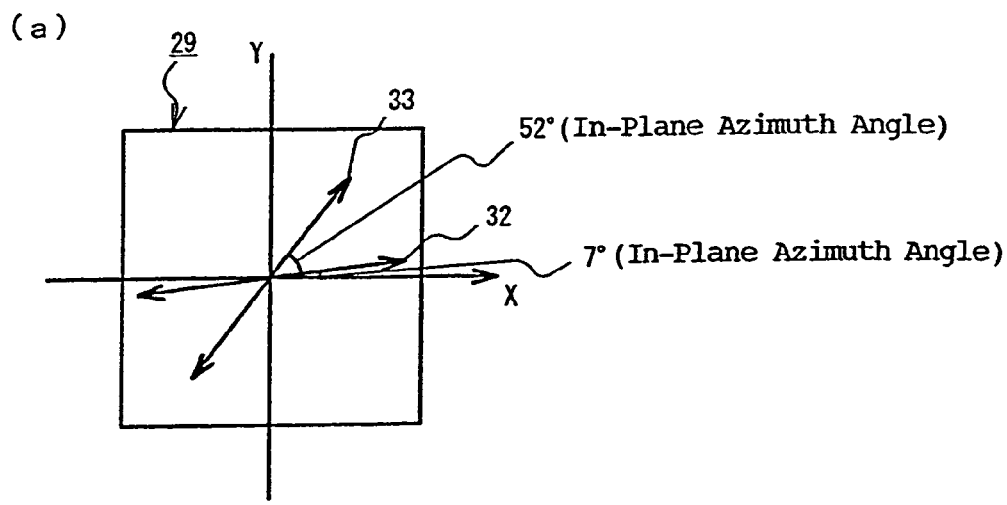
Figure 5:
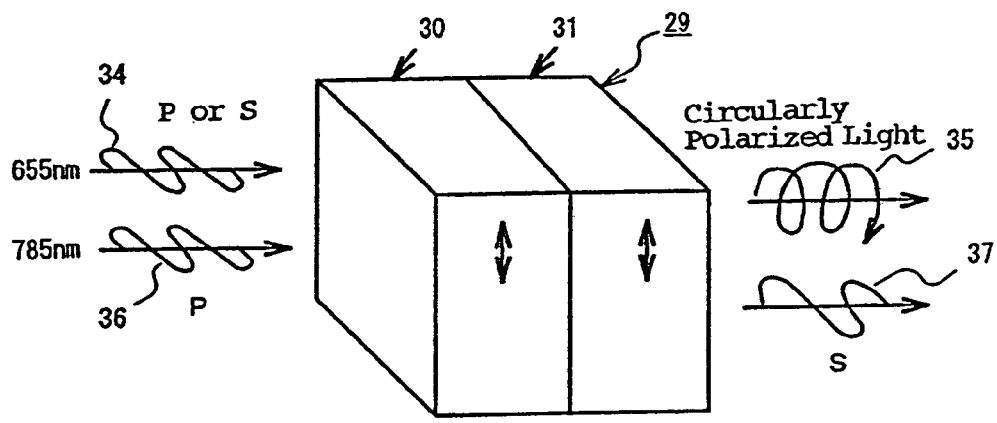

FIG. 5 is a diagram for showing the configuration of a wave plate according to a modification of the present invention, in which FIG. 5(a) is a plan view of the wave plate as seen from the incident direction, and FIG. 5(b) is a schematic perspective view of the wave plate. This wave plate 29 is a laminated wave plate, wherein a quartz crystal wave plate 30 with a phase difference of 2700° (seventh-order 180°) with respect to a wavelength of 655 nm and an in-plane azimuth angle of 7°, and a quartz crystal wave plate 31 with a phase difference of 630° (first-order 270°) and an in-plane azimuth angle of 52° are laminated together in such a way that those crystal optical axes 32 and 33 cross each other at an angle of 45°, and which, as a whole, functions as a quarter-wave plate at the wavelength of 655 nm and functions as a half-wave plate at the wavelength of 785 nm. That is, as a linearly polarized light 34 with the wavelength of 655 nm enters the laminated wave plate 29, the phase is shifted by 90° at the emergence plane so that it is output as a circularly polarized light 35, and as a P-polarized light 36 with the wavelength of 785 nm is input, the phase is shifted by 180° at the emergence plane so that it is output as a S-polarized light 37.

Computation of the optical characteristics of the laminated quartz crystal wave plates 30 and 31 to allow the laminated wave plate 29 to function as a quarter-wave plate at the wavelength of 655 nm and as a half-wave plate at the wavelength of 785 nm has been given by Mueller matrixes used in the above-described embodiment, therefore its description will be omitted here. The optical action will be explained in detail below.

FIG. 5(c) shows the phase differences of the wave plates 30 and 31 at individual wavelengths. When the linearly polarized light 34 with the wavelength of 655 nm enters the wave plate 30, it is with a phase difference of 180° at the wave plate 30, and the polarization plane of 14° is rotated. Further, the linearly polarized light 34 is given with a phase difference of 270° at the wave plate 31 and is output as the circularly polarized light 35. For the linearly polarized light with the wavelength of 785 nm, the phase is considerably changed, i.e., the phase difference becomes 100° at the wave plate 30 and the light becomes an elliptically polarized light and can be returned to the linearly polarized light as it is given with a phase difference of 167° at the wave plate 31.

Figure 13:
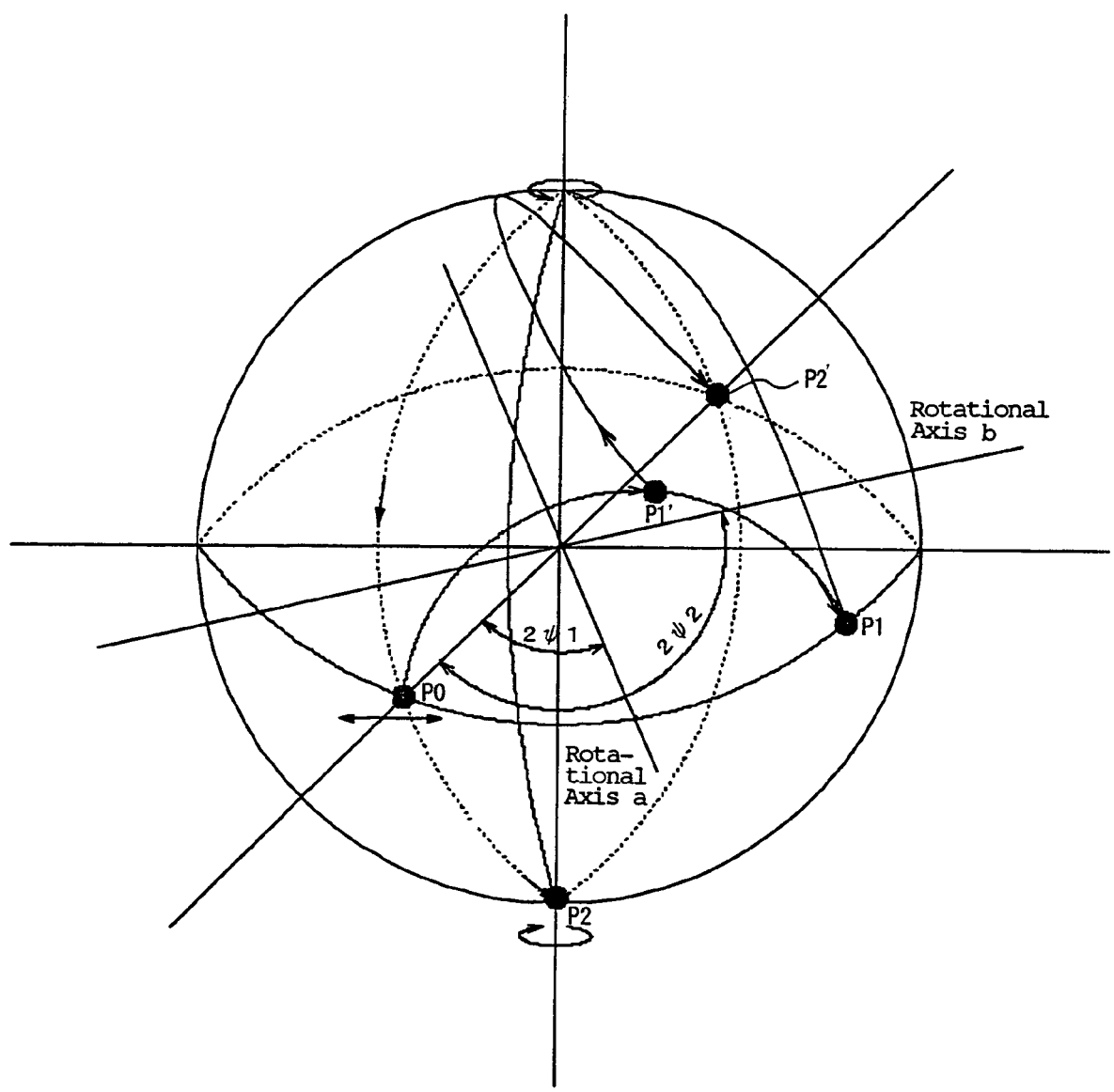
FIG. 13 is a diagram for explaining the optical action of the first modification of the laminated wave plate according to the present invention using a Poincare sphere.
Figure 14:
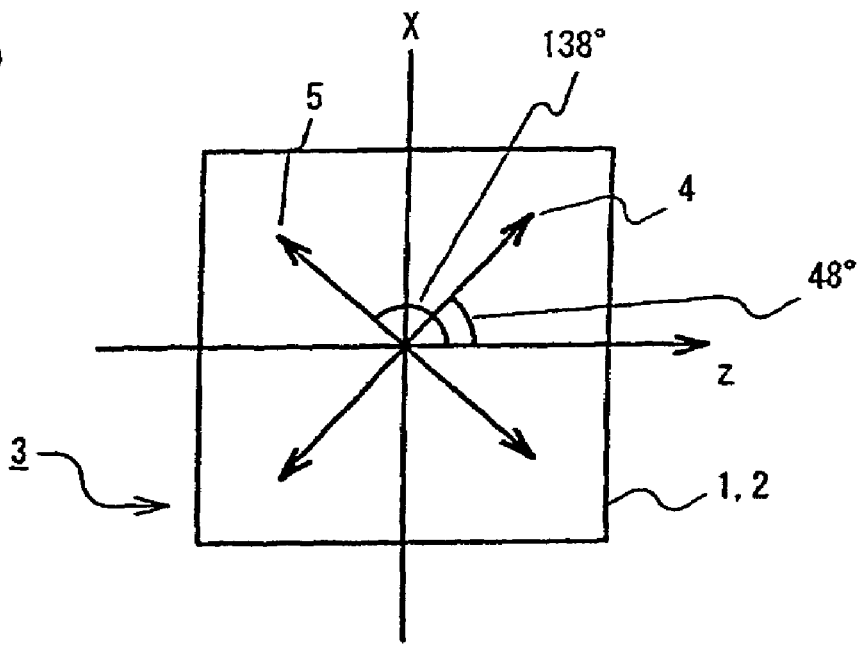
Figure 14:
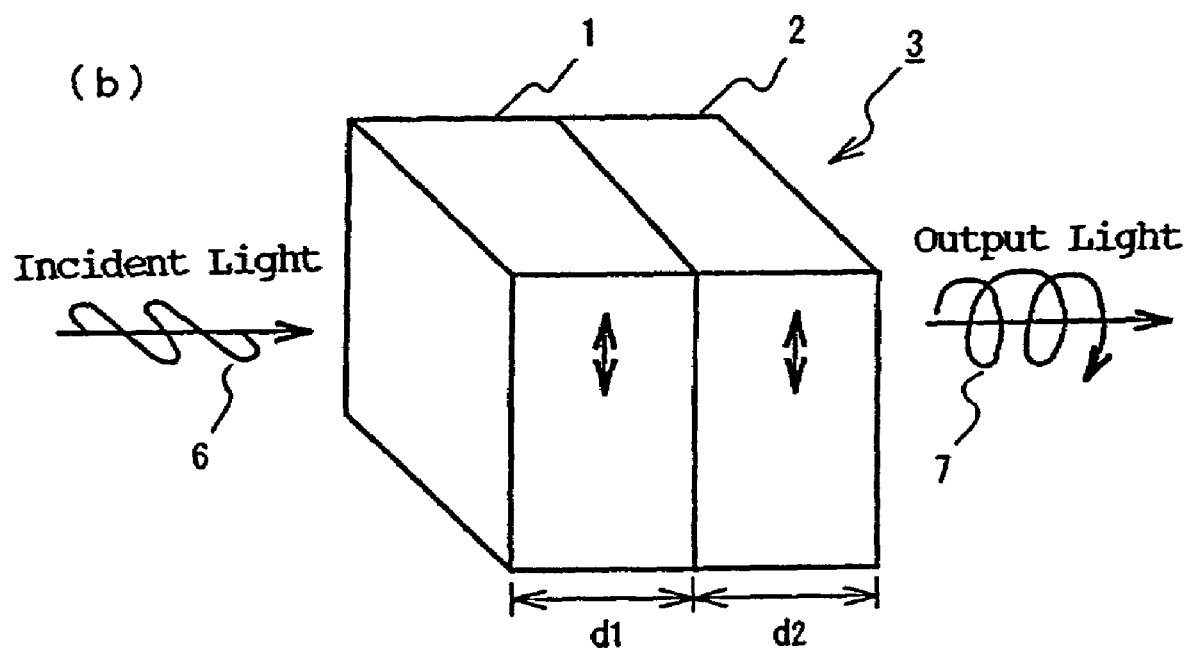
Figure 15:
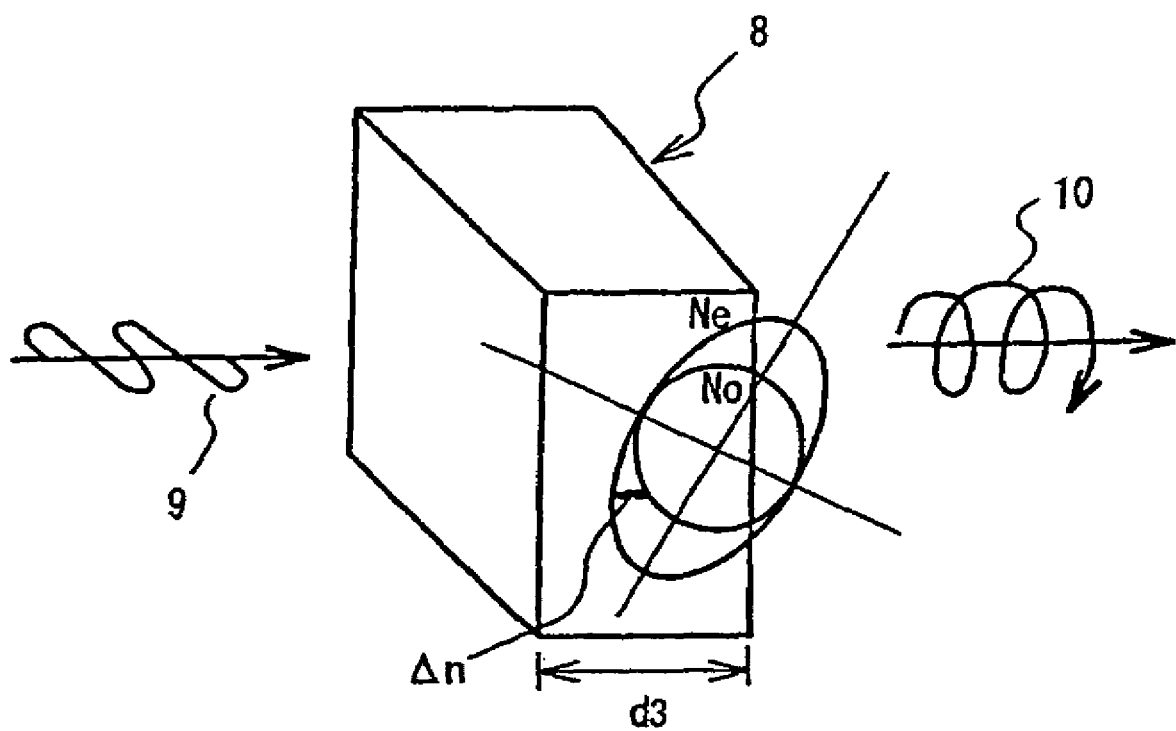
FIG. 15 is a perspective view for showing a conventional wave plate.

The optical action will be described by using a Poincare sphere as shown in FIG. 13. Here, the polarization state of incident light is P0. At the wavelength of 655 nm, a rotational axis a of the wave plate 30 is placed at a position with an angle 2Ψ1 by the in-plane azimuth angle Ψ1 (=7°). As it is rotated around the rotational axis a by 2700°, the rotational axis a is moved to the position of P1 after seven rotations. Further, a rotational axis b of the wave plate 31 is placed at a position with an angle 2Ψ2 by an in-plane azimuth angle Ψ2 (=52°). As it is rotated around the rotational axis b by 630°, the rotational axis b is moved to the position of P2 after one rotation. Accordingly, the phase difference as a whole becomes 270° and the light is output as the circularly polarized light with the leftward rotation.

Figure 6:
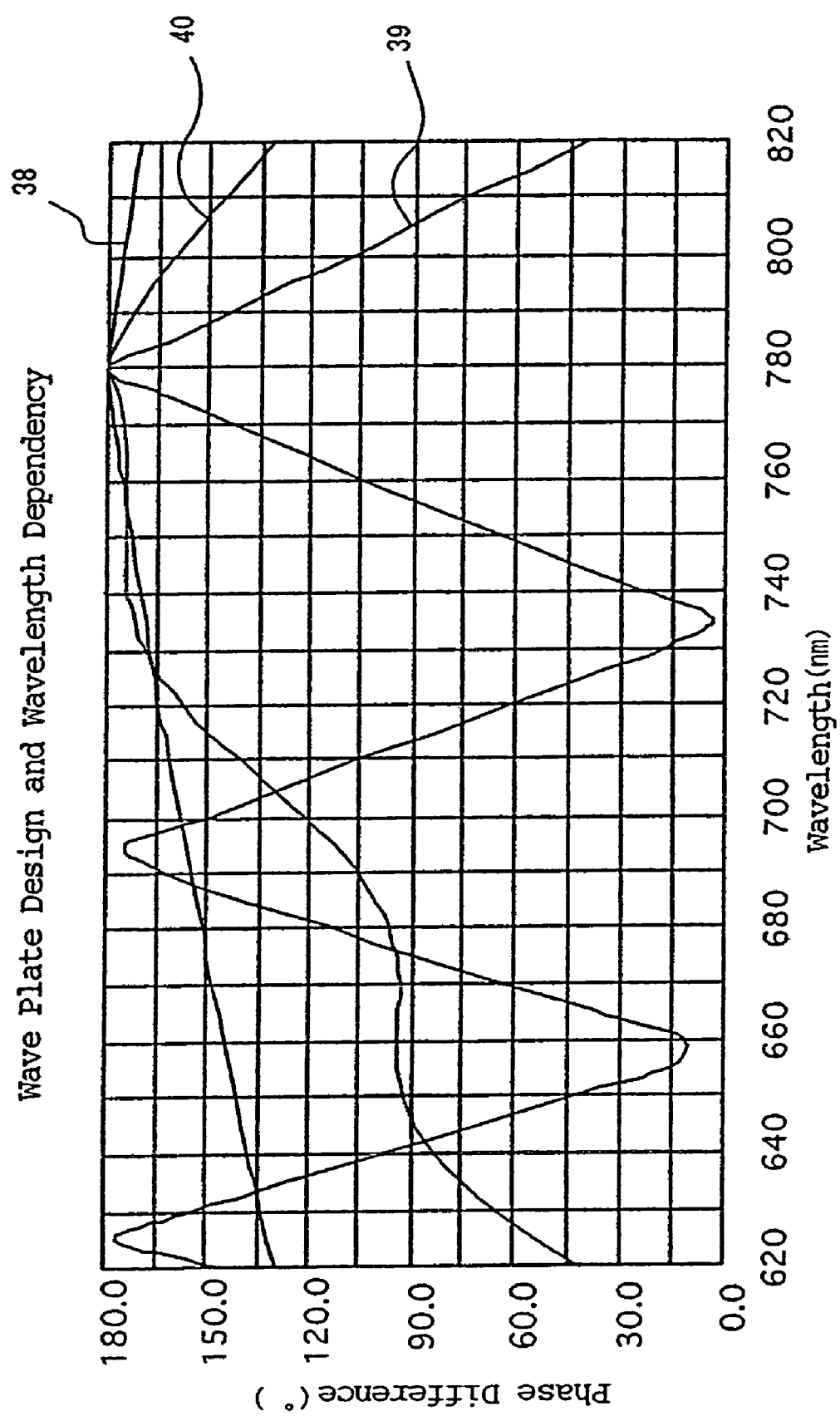
FIG. 6 is a graph for explaining a wavelength dependence in the first modification of the laminated wave plate according to the present invention.

Next, at the wavelength of 785 nm, the rotational axis a of the wave plate 30 is moved to a position of P1' after six rotations about the rotational axis a and the rotational axis b of the wave plate 31 is moved to a position of P2' after one rotation about the rotational axis b, so that the phase difference as a whole becomes 180° and the polarization plane is rotated by 90°. The wavelength dependence of the wave plate 29 is shown in FIG. 6. A curve 38 shows the wavelength dependence of the zero-order half-wave plate for the wavelength of 785 nm, a curve 39 shows the wavelength dependence of the 15th half-wave plate for the wavelength of 785 nm, and a curve 40 shows the wavelength dependence of the wave plate 29, making it apparent that the wave plate 29 functions as a quarter-wave plate at the wavelength of 655 nm and functions as a half-wave plate at the wavelength of 785 nm.

Figure 7:
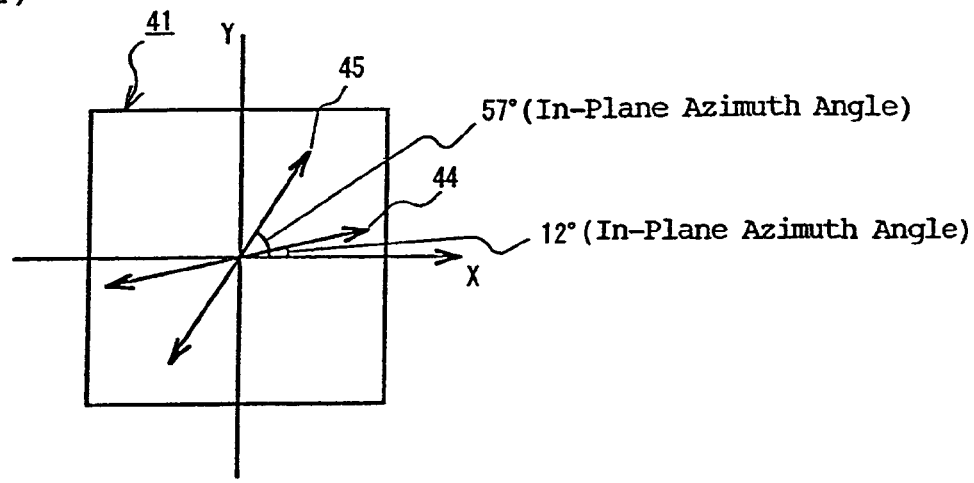
Figure 7:
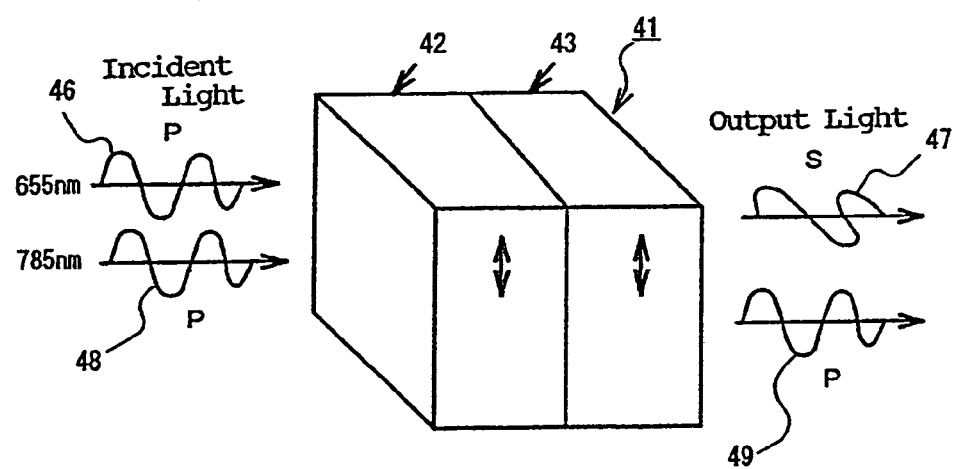

FIG. 7 is a diagram for showing the configuration of a wave plate according to a second modification of the present invention, in which FIG. 7(a) is a plan view of the wave plate as seen from the incident direction, and FIG. 7(b) is a schematic perspective view of the wave plate. This wave plate 41 is a laminated wave plate, wherein a quartz crystal wave plate 42 with a phase difference of 2700° (seventh-order 180°) with respect to the wavelength of 655 nm and an in-plane azimuth angle of 12°, and a quartz crystal wave plate 43 with a phase difference of 1260° (third-order 180°) and an in-plane azimuth angle of 57° are laminated together in such a way that those crystal optical axes 44 and 45 cross each other at an angle of 45°, and which, as a whole, functions as a half-wave plate at the wavelength of 655 nm and functions as a 2/2 wave plate at the wavelength of 785 nm. That is, when a P-polarized light 46 with the wavelength of 655 nm enters the laminated wave plate 41, the phase is shifted by 180° at the emergence plane so that it is output as a S-polarized light 47, and when a P-polarized light 48 with the wavelength of 785 nm is input, the phase is shifted by 360° at the emergence plane so that it is output, remaining as the P-polarized light.

Figure 8:
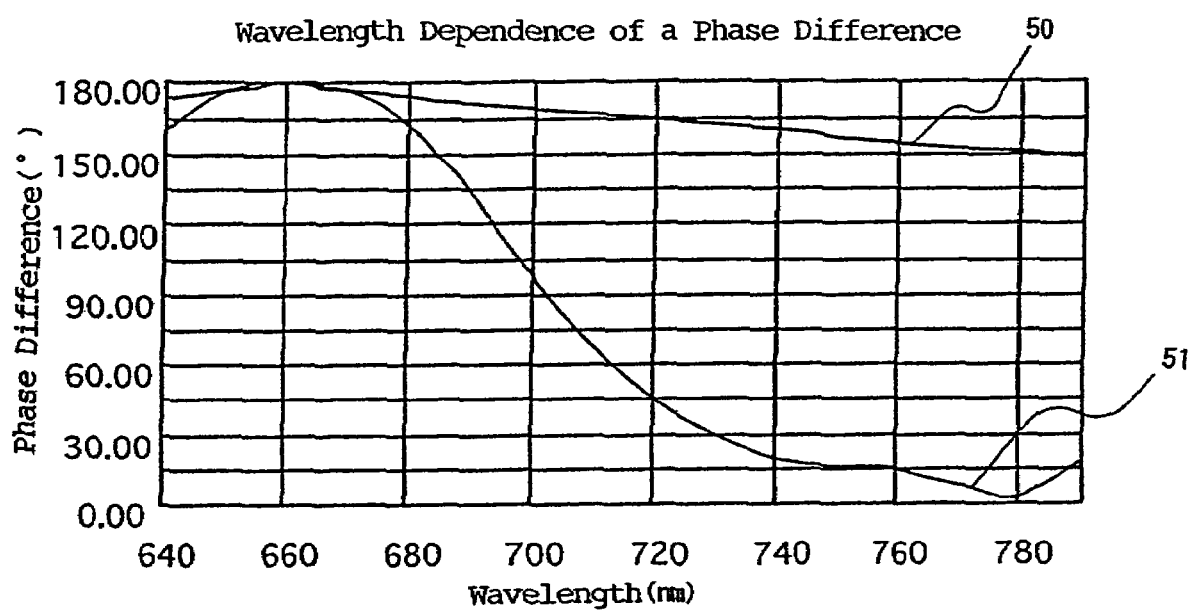
FIG. 8 is a graph for explaining the wavelength dependence in the second modification of the laminated wave plate according to the present invention.

Computation of the optical characteristics of the laminated quartz crystal wave plates 42 and 43 in order to allow the laminated wave plate 41 to function as a half-wave plate at the wavelength of 655 nm and as a 2/2 wave plate at the wavelength of 785 nm has been given by Mueller matrixes in the same as the above-described embodiment. Therefore its description will be omitted here. The wavelength dependence of the wave plate 41 is shown in FIG. 8. A curve 50 shows the wavelength dependence of a zero-order quarter-wave plate for the wavelength of 655 nm, and a curve 51 shows the wavelength dependence of the wave plate 41. It is apparent that the wave plate 41 functions as a half-wave plate at the wavelength of 655 nm and functions as a 2/2 wave plate at the wavelength of 785 nm.

If the individual wave plates are laminated with the in-plane azimuth angles having a precision of ±5° to the desired values, the wave plate sufficiently functions as desired with respect to each wavelength, so that cost reduction can be expected even in the mass production.

The feature of the present invention lies in that in view of the problem that the phase difference fluctuates significantly by a change in the wavelength of a laser light due to large wavelength dependence provided if a single zero-order wave plate is simply set in multiple-order, another wave plate for compensation is additionally laminated to compensate for a change in phase in the wavelength band in use in order to realize a wave plate which is allowed to function as a quarter-wave plate or a half-wave plate with respect to plural different wavelengths.

That is, wave plates are designed and constructed in such a way that the wavelength dependences are adjusted by changing the multiple orders of the individual wave plates to be laminated and are compensated for each other.

Further, a broadband wave plate which has been proposed is so constructed as to function as a quarter-wave plate over a wide range of wavelengths, but does not completely function as a quarter-wave plate as apparent from the transmittance of the crossed nicols, i.e., there is a problem that a loss always occurs. Another feature of the present invention lies in that in consideration of the above problem, there is realized a wave plate which completely functions as a quarter-wave plate in pinpoint with respect to a plurality of different wavelengths from the opposite idea that the phase difference is set to a ¼ wavelength over a broadband.

Next, an optical pickup which copes with two wavelengths which uses the laminated wave plate according to the present invention will be explained in detail below.

Figure 9:
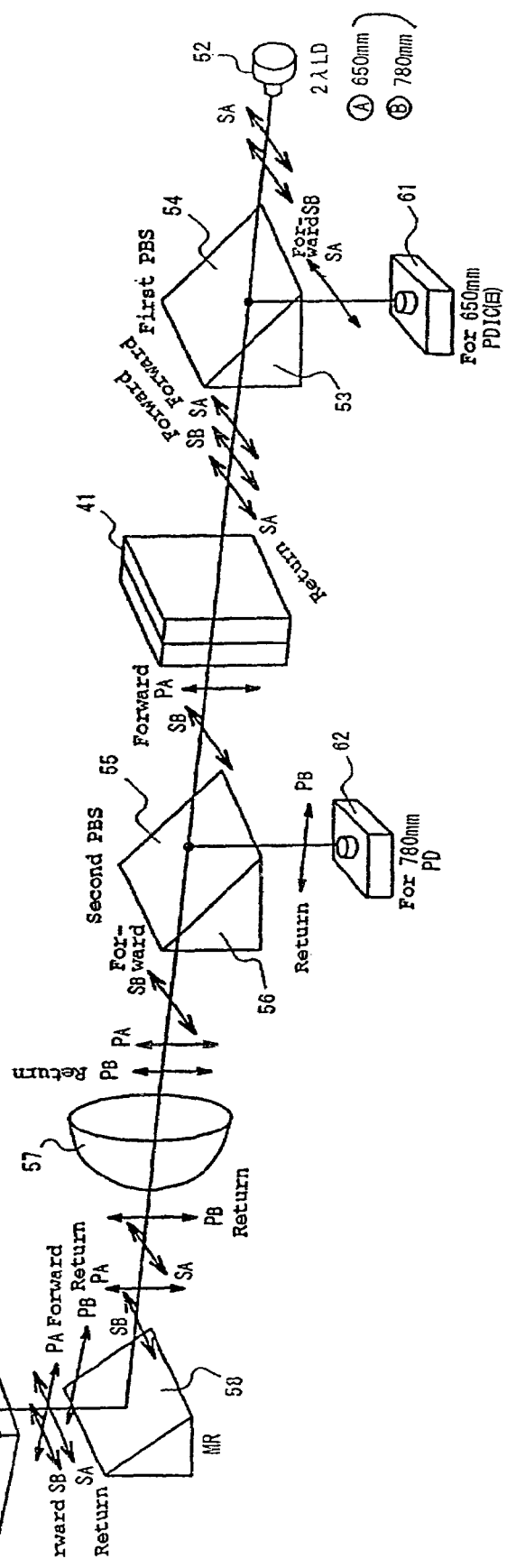
FIG. 9 is a perspective view for explaining the configuration of the first embodiment of an optical pickup according to the present invention.

FIG. 9 is a perspective view for explaining the configuration of showing a first embodiment of an optical pickup according to the present invention.

Figure 10:
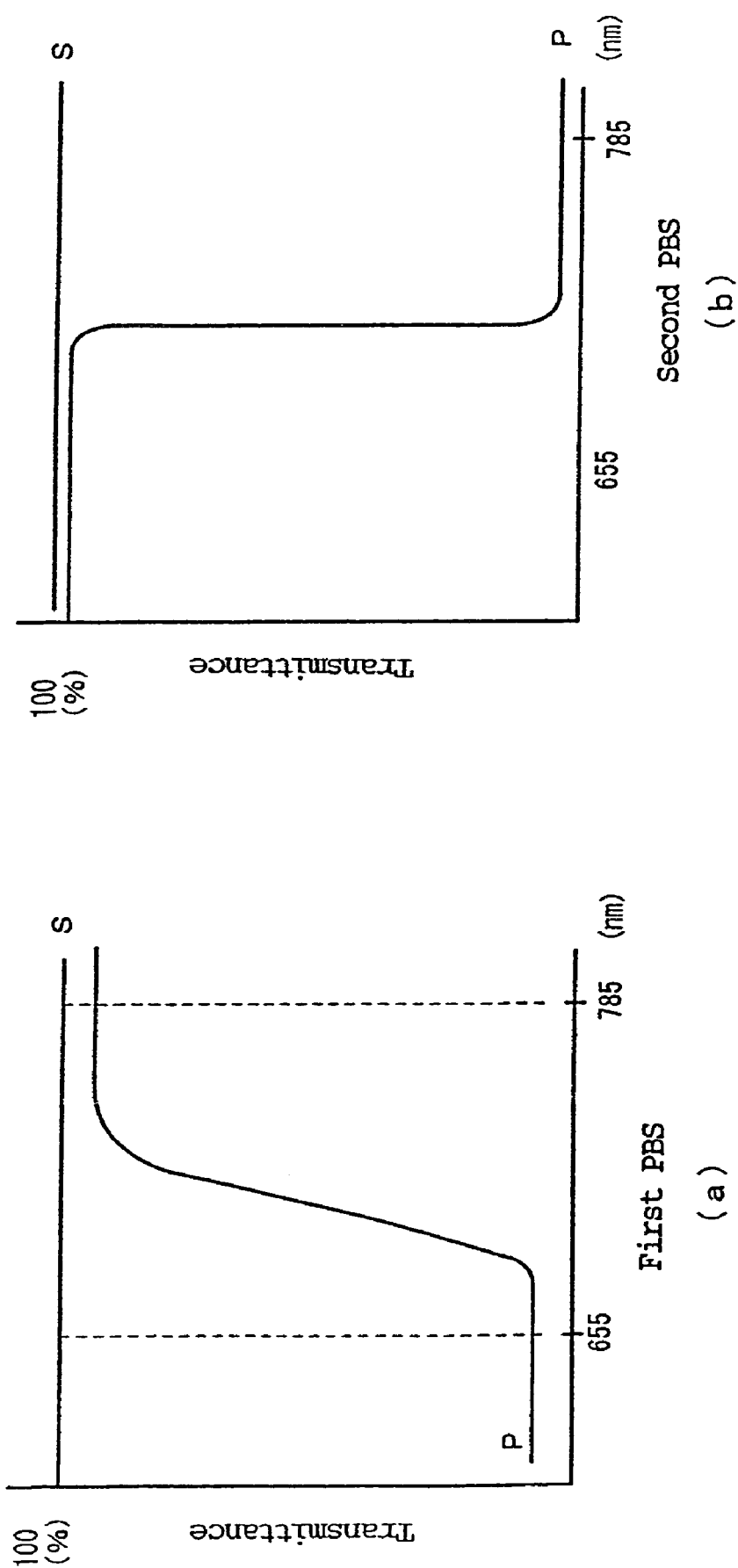
FIGS. 10(a) and 10(b) are graphs for showing the optical characteristics of two types of PBSs which are used in the first embodiment of the optical pickup according to the present invention.

Playback of a DVD (655 nm) will be mentioned below. Linearly polarized light SA (S-polarized light) with the wavelength of 655 nm is output from a 2λ LD 52 having a light source capable of outputting the wavelength of 655 nm and 785 nm and is input to a first PBS 53. Since an optical thin film having transmittance characteristics as shown in FIG. 10(*a*) is formed on an inclined surface 54 of the first PBS 53, SA passes the inclined surface 54 of the first PBS 53 and enters the laminated wave plate 41 illustrated in the second modification. Since it functions as a half-wave plate with respect to the wavelength of 655 nm as mentioned above, the linearly polarized light SA is given a phase difference of 180° and is output as a linearly polarized light PA (P-polarized light). PA enters a second PBS 56 on whose inclined surface 55 an optical thin film having transmittance characteristics as shown in FIG. 10(*b*) is formed, passes the inclined surface 55, enters the quarter-wave plate 22 illustrated in one embodiment of the present invention through a collimate lens 57 and a reflection mirror 58, emerges as circularly polarized light, passes through an objective lens (hereinafter, "OBJ") 59 and enters a pit 60 of the DVD.

At the time of being reflected at the pit 60, the circularly polarized light reverses the rotational direction thereof, and passes the OBJ 59 and enters the quarter-wave plate 22. Since the rotational direction of the circularly polarized light is opposite in the return path to that in the forward path, the light is output as the linearly polarized light SA (S-polarized light) and is input to the second PBS 56 through the reflection mirror 58 and the collimate lens 57. Due to the characteristics of the optical thin film formed on the inclined surface 55 of the second PBS 56, SA passes therethrough, enters the laminated wave plate 41 where it is given a phase difference of 180°, and is output as PA (P-polarized light) and is input to the first PBS 53. Since the optical thin film through which P-polarized light with the wavelength of 655 nm does not pass is formed on the inclined surface 54, PA is reflected at the inclined surface 54 and is detected by a PD 61.

Next, playback of a CD (785 nm) will be explained. Linearly polarized light SB (S-polarized light) with the wavelength of 785 nm is output from the 2λ LD 52 and is input to the first PBS 53. Since the optical thin film having the transmittance characteristics as shown in FIG. 10(*a*) is formed on the inclined surface 54 of the first PBS 53, SB passes the inclined surface 54 and enters the laminated wave plate 41. Since it functions as a 2/2 wave plate with respect to the wavelength of 785 nm as mentioned above, the linearly polarized light SB is output remaining as it is. SB enters the second PBS 56 on whose inclined surface 55 the optical thin film having the transmittance characteristics as shown in FIG. 10(*b*) is formed, passes the inclined surface 55, enters the quarter-wave plate 22 through the collimate lens 57 and the reflection mirror 58, emerges as the circularly polarized light, passes through the OBJ 59 and enters the pit 60 of the CD.

At the time of being reflected at the pit 60, the circularly polarized light reverses the rotational direction, and passes the OBJ 59 and enters the quarter-wave plate 22. Since the rotational direction of the circularly polarized light is opposite in the return path to that in the forward path, the light is output as the linearly polarized light PB (P-polarized light) and is input to the second PBS 56 through the reflection mirror 58 and the collimate lens 57. Due to the characteristics of the optical thin film formed on the inclined surface 55 of the second PBS 56, PB is reflected at the inclined surface 55 and is detected by a PD 62.

With such a configuration, an optical pickup device which copes with two wavelengths can be realized with a single pickup.

Although the quarter-wave plate 22 shown in FIG. 1 which is the first embodiment is used as the quarter-wave plate, it is needless to say that the quarter-wave plate 71 shown in FIG. 3 which is the second embodiment may be used.

Figure 11:
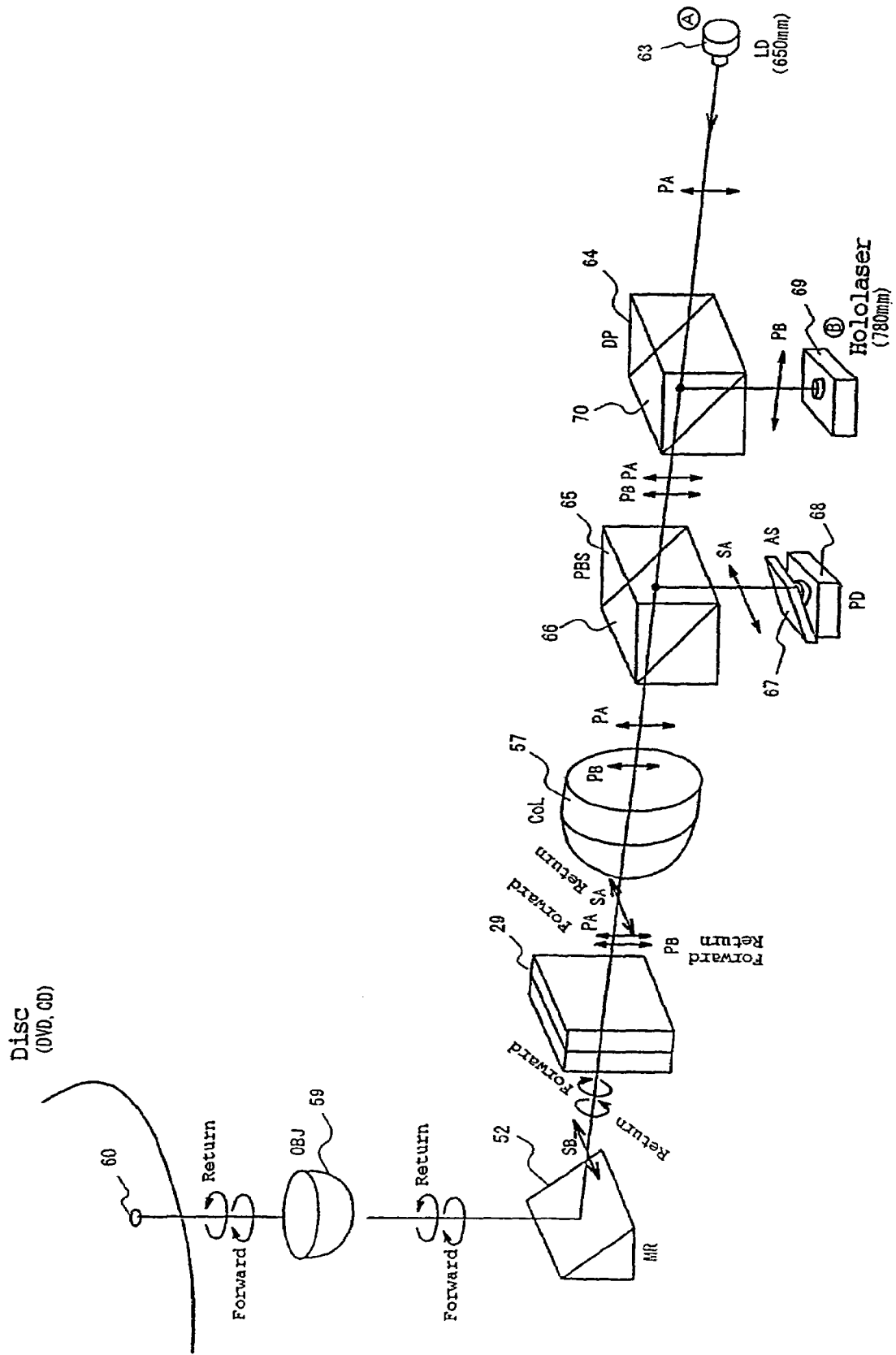
FIG. 11 is a perspective view for explaining the configuration of the second embodiment of the optical pickup according to the present invention.
Figure 12:
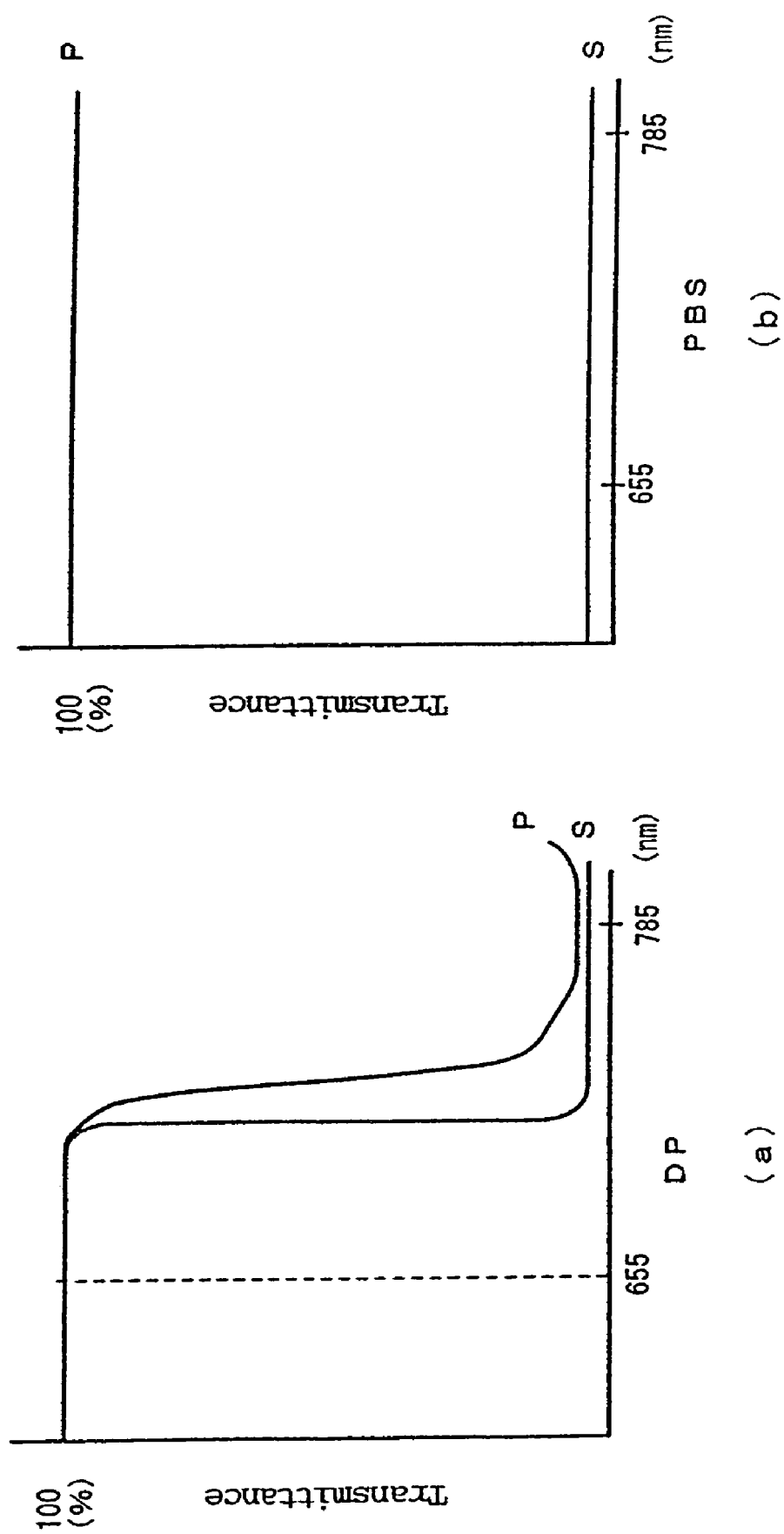
FIGS. 12(a) and 12(b) are graphs for showing the optical characteristics of a DP and PBS which are used in the second embodiment of the optical pickup according to the present invention.

FIG. 11 is a perspective view for explaining the configuration of a second embodiment of an optical pickup according to the present invention. First, playback of a DVD (655 nm) will be explained. Linearly polarized light PA (P-polarized light) with the wavelength of 655 nm is output from an LD 63 having a light source which outputs the wavelength of 655 nm, and is input to a dichroic prism (hereinafter, "DP") 64. Since the DP 64 has the optical characteristics as shown in FIG. 12(*a*), PA passes the DP 64 and enters the PBS 65. Since an optical thin film having characteristics as shown in FIG. 12(*b*) is formed on an inclined surface 66 of the PBS 65, PA passes the inclined surface 66, passes the collimate lens 57 and enters the laminated wave plate 29 illustrated in the first modification. Since it functions as a quarter-wave plate with respect to the wavelength of 655 nm as mentioned above, the linearly polarized light PA is given a phase difference of 90° and is output as circularly polarized light, and is input to a pit 60 of the DVD through the reflection mirror 58 and the OBJ 59.

At the time of being reflected at the pit 60, the circularly polarized light reverses the rotational direction thereof, and passes the OBJ 59 and the reflection mirror 58 and enters the laminated wave plate 29. As the rotational direction of the circularly polarized light is opposite in the return path to that in the forward path, the light is output as the linearly polarized light SA (S-polarized light), is input to the PBS 65 through the collimate lens 57, is reflected at the inclined surface 66 of the PBS 65 and is detected by a PD 68 via an astigmatism plate (hereinafter, "AS plate") 67. Note that astigmatism is aberration such that the focal point of light from an object point outside the optical axis deviates between a meridional surface and a sagittal surface.

Next, playback of a CD (785 nm) will be described. Linearly polarized light PB (P-polarized light) with the wavelength of 785 nm is output from a hololaser (an integrated module of an LD and PD) 69, is input to the DP 64, is reflected at an inclined surface 70 of the DP 64, which has the transmittance characteristics as shown in FIG. 12(*a*), and is input to the PBS 65. Since the inclined surface 66 of the PBS 65 passes P-polarized light, PB passes the inclined surface 66, passes the collimate lens 57 and enters the laminated wave plate 29. Since it functions as a half-wave plate with respect to the wavelength of 785 nm as mentioned above, the light is given a phase difference of 180°, is output as SB (S-polarized light) and is input to the pit 60 of the CD through the reflection mirror 58 and the OBJ 59.

SB reflected at the pit 60 is input to the laminated wave plate 29 through the OBJ 59 and the reflection mirror 58. The light is given a phase difference of 180° there, is output as PB (P-polarized light), passes the collimate lens 57, and is input to the DP 64 through the PBS 65 which passes P-polarized light. Since the DP 64 has such optical characteristics as not to pass P-polarized light with the wavelength of 785 nm, PB is reflected at the inclined surface 70 of the DP 64 and is detected by the hololaser 69.

Even with the pickup structure, an optical pickup device which copes with two different wavelengths can be realized with a single pickup.

It is therefore possible to provide a smaller pickup device which copes with two different wavelengths, such as one compatible with a DVD/CD.

Although the description has been given of an example in which a quartz crystal is used for a wave plate, the present invention is not limited to this case but a laminated wave plate according to the present invention can of course be adapted widely to a crystal having birefringence and a resin such as a film.

As described above, the present invention has the following excellent effects.

The present invention according to claim 1 is constructed by laminating a first wave plate with a phase difference α and a second wave plate with a phase difference β with respect to monochromatic light with a wavelength λ in such a way that directions of optical axes of said plates intersect each other, so that the relationship between the α and the β a satisfies the following formulas.

$$(3/2) \times \pi \neq \alpha - 2 \times \pi \times (m-1)$$

$$\pi \neq \beta - 2 \times \pi \times (n-1)$$

wherein: each of m and n is a positive integer, and therefore demonstrates an excellent effect of providing a laminated wave plate which, as a whole, functions as a quarter-wave plate with compensated wavelength dependence.

As the present inventions according to claims 2 and 3 use a laminated wave plate which, as a whole, functions as a quarter-wave plate with compensated wavelength dependence, they demonstrate an excellent effect of providing a small pickup which copes with a plurality of different wavelengths.

The present inventions according to claims 4 and 5 laminate a wave plate A having a phase difference of 1695° and a wave plate B having a phase difference of 850° with respect to a wavelength of 785 nm in such a way that directions of optical axes of said plates intersect each other, and therefore demonstrate an excellent effect of providing a laminated wave plate which, as a whole, functions as a quarter-wave plate with compensated wavelength dependence.

The present inventions according to claims 6 and 7 laminate a wave plate C having a phase difference of 2700° and a wave plate D having a phase difference of 630° with respect to a wavelength of 655 nm in such a way that directions of optical axes of said plates intersect each other, and therefore demonstrate an excellent effect of providing a laminated wave plate which functions as a quarter-wave plate with respect to the wavelength of 655 nm and functions as a half-wave plate with respect to a wavelength of 785 nm.

The present inventions according to claims 8 and 9 laminate a wave plate E having a phase difference of 2700° and a wave plate F having a phase difference of 1260° with respect to the wavelength of 655 nm in such a way that directions of optical axes of said plates intersect each other, and therefore demonstrate an excellent effect of providing a laminated wave plate which functions as a half-wave plate with respect to the wavelength of 655 nm and functions as a 2/2 wave plate with respect to a wavelength of 785 nm.

The present invention according to claim 10 is constructed in such a way that a first linearly polarized light with a wavelength of 655 nm and a second linearly polarized light with a wavelength of 785 nm, output from a light source, pass a first wave plate and a second wave plate in order, and the first wave plate is a laminated wave plate, wherein a wave plate C having a phase difference of 2700° and a wave plate D having a phase difference of 1260° with respect to the wavelength of 655 nm are laminated in such a way that directions of optical axes of said plates intersect each other, and the second wave plate is a laminated wave plate, wherein a wave plate A having a phase difference of 1695° and a wave plate B having a phase difference of 850° with respect to the wavelength of 785 nm are laminated in such a way that directions of optical axes of said plates intersect each other, so that the present invention demonstrates an excellent effect of providing a small pickup which copes with a plurality of different wavelengths.

The present invention according to claim 11 uses a laminated wave plate which has a wave plate C having a phase difference of 2700° and a wave plate D having a phase difference of 630° with respect to a wavelength of 655 nm laminated in such a way that directions of optical axes of said plates intersect each other, and therefore demonstrates an excellent effect of providing a small pickup which copes with the wavelength of 655 nm and a wavelength of 785 nm.

The present invention according to claim 12 is constructed by laminating a first wave plate with a phase difference α and a second wave plate with a phase difference β with respect to monochromatic light with a wavelength λ in such a way that directions of optical axes of said plates intersect each other, so that the relationship between the α and the β satisfies the following formulas.

$$\pi = \alpha - 2 \times \pi \times (m-1)$$

$$(3/2) \times \pi = \beta - 2 \times \pi \times (n-1),$$

wherein: each of m and n is a positive integer and therefore demonstrates an excellent effect of providing a laminated wave plate which, as a whole, functions as a quarter-wave plate with compensated wavelength dependence.

As the present inventions according to claims 13 and 14 use a laminated wave plate which, as a whole, functions as a quarter-wave plate with compensated wavelength dependence, they demonstrate an excellent effect of providing a small pickup which copes with a plurality of different wavelengths.

The present inventions according to claims 15 and 16 laminate a wave plate A having a phase difference of 1980° and a wave plate B having a phase difference of 990° with respect to a wavelength of 785 nm or 655 nm in such a way that directions of optical axes of said plates intersect each other, and therefore demonstrate an excellent effect of providing a laminated wave plate which, as a whole, functions as a quarter-wave plate with compensated wavelength dependence.

The present invention according to claim 17 is constructed in such a way that a first linearly polarized light with a wavelength of 655 nm and a second linearly polarized light with a wavelength of 785 nm, output from a light source, pass a first wave plate and a second wave plate in order, and the first wave plate is a laminated wave plate, wherein a wave plate C having a phase difference of 2700° and a wave plate D having a phase difference of 1260° with respect to the wavelength of 655 nm are laminated in such a way that directions of optical axes of said plates intersect each other, and the second wave plate is a laminated wave plate wherein a wave plate A having a phase difference of 1980° and a wave plate B having a phase difference of 990° with respect to a wavelength of 785 nm are laminated in such a way that directions of optical axes of said plates intersect each other, and therefore demonstrates an excellent effect of providing a small pickup which copes with a plurality of different wavelengths.

The invention claimed is:

1. A laminated wave plate comprising:
a first wave plate with a phase difference α and an azimuth angle $\theta_1$ with respect to monochromatic light with a wavelength λ, and
a second wave plate with a phase difference β and azimuth angle $\theta_2$ with respect to monochromatic light with a wavelength λ,
said first and second wave plate being laminated together in such a way that directions of optical axes of said plates intersect each other, so that
said wave-plate functions as a phase difference Γ with respect to lights of two wavelengths λ1 and λ2 which are different from each other;
characterized in that
said wavelength λ is λ=λ1 or λ=λ2,
a refractive index of normal ray of said first wave plate is $N_{O1}$, a refractive index of abnormal ray of said first wave plate is $N_{e1}$ and a thickness of said first wave plate is $d_1$,
a refractive index of normal ray of said second wave plate is $N_{o2}$, a refractive index of abnormal ray of said first wave plate is $N_{e2}$, and a thickness of said first wave plate is $d_2$,
said phase differences α and β respectively satisfy following formulas (3) and (4):

$$\alpha = 2 \times \pi/\lambda \times (N_{e1} - N_{o1}) \times d_1 \quad (3)$$

$$\beta = 2 \times \pi/\lambda \times (N_{e2} - N_{o2}) \times d_2 \quad (4)$$

said first wave plate satisfies a Mueller matrix $A_1$ of a following formula (5):

$$A_1 = \begin{bmatrix} 1 & 0 & 0 & 0 \\ 0 & 1-(1-\cos\alpha)\sin^2 2\theta_1 & (1-\cos\alpha)\sin 2\theta_1 \cos 2\theta_1 & -\sin\alpha \sin 2\theta_1 \\ 0 & (1-\cos\alpha)\sin 2\theta_1 \cos 2\theta_1 & 1-(1-\cos\alpha)\sin^2 2\theta_1 & \sin\alpha \sin 2\theta_1 \\ 0 & \sin\alpha \sin 2\theta_1 & -\sin\alpha \sin 2\theta_1 & \cos\alpha \end{bmatrix} \quad (5)$$

said second wave plate satisfies a Mueller matrix $A_2$ of a following formula (6):

$$A_2 = \begin{bmatrix} 1 & 0 & 0 & 0 \\ 0 & 1-(1-\cos\beta)\sin^2 2\theta_2 & (1-\cos\beta)\sin 2\theta_2 \cos 2\theta_2 & -\sin\beta \sin 2\theta_2 \\ 0 & (1-\cos\beta)\sin 2\theta_2 \cos 2\theta_2 & 1-(1-\cos\beta)\cos^2 2\theta_2 & \sin\beta \cos 2\theta_2 \\ 0 & \sin\beta\cos 2\theta_2 & -\sin\beta \sin 2\theta_2 & \cos\beta \end{bmatrix} \quad (6)$$

an incident light input to said laminated wave plate is expressed by a Stokes vector T of a following formula (7):

$$T = \begin{bmatrix} t_1 \\ t_2 \\ t_3 \\ t_4 \end{bmatrix} \quad (7)$$

an emitted light output from said laminated wave plate is expressed by a Stokes vector S of the following formula (8):

$$S = \begin{bmatrix} S_1 \\ S_2 \\ S_3 \\ S_4 \end{bmatrix} \quad (8)$$

a relationship between said Stokes vector T and said Stokes vector S satisfies the following formulas (9) and (11):

$$\begin{bmatrix} S_1 \\ S_2 \\ S_3 \\ S_4 \end{bmatrix} = A_2 \cdot A_1 \begin{bmatrix} t_1 \\ t_2 \\ t_3 \\ t_4 \end{bmatrix} \quad (9)$$

$$S = A_2 \cdot A_1 \begin{bmatrix} 1 \\ 1 \\ 0 \\ 0 \end{bmatrix} \quad (11)$$

wherein when said phase difference Γ of said laminated wave plate is expressed by a following formula (12):

$$\Gamma = \arctan \frac{S_3}{\sqrt{S_1^2 + S_2^2}} \quad (12)$$

said phase difference Γ in said wavelength λ1 and said wavelength λ2 satisfied a following formula:

$$\Gamma = (2 \times N - 1) \times (\pi/2)$$

wherein N is a positive integer.

2. A laminated wave-plate comprising:
a first wave plate with a phase difference α and an azimuth angle $\theta_1$ with respect to monochromatic light with a wavelength λ, and
a second wave plate with a phase difference β and an azimuth angle $\theta_2$ with respect to monochromatic light with a wavelength λ,
said first and second wave plate being laminated together in such a way that directions of optical axes of said plates intersect each other;
characterized in that
said phase difference α is a multiple-order 255° and said phase difference β is multiple-order 130°, and
said azimuth angle $\theta_1$ and said azimuth angle $\theta_2$ satisfy:

$$\theta_1 = 25.5° \pm 5°$$

$\theta_1=25.5°±5°$ $\theta_2=79.8°±5°$.

3. The laminated wave plate according to claim 2, wherein said phase difference α is fourth-order 255°, and said phase difference β is second-order 130°.

4. The laminated wave plate according to claim 2 or 3, wherein said laminated wave plate functions as a quarter-wave plate with respect to wavelengths of 655 nm and 785 nm.

5. A laminated wave plate comprising:
a first wave plate with a phase difference α and an azimuth angle $\theta_1$ with respect to monochromatic light with a wavelength λ, and
a second wave plate with a phase difference β and an azimuth angle $\theta_2$ with respect to monochromatic light with a wavelength λ,
said first and second wave plate being laminated together in such a way that directions of optical axes of said plates intersect each other;
characterized in that
said phase difference α is a multiple-order 180°, and said phase difference β is multiple-order 270, and
said azimuth angle $\theta_1$ and said azimuth angle $\theta_2$ satisfy:

$\theta_1=14°±5°$ $\theta_2=72°±5°$.

6. The laminated wave plate according to claim 5, wherein said phase difference α is fifth-order 180°, and said phase difference β is second-order 270°.

7. The laminated wave plate according to claim 5 or 6, wherein said laminated quarter plate functions as a quarter-wave plate with respect to light with wavelengths of 655 nm and 785 nm.

8. A laminated wave plate comprising:
a first wave plate with a phase difference α and an azimuth angle $\theta_1$ with respect to monochromatic light with a wavelength λ, and
a second wave plate with a phase difference β and an azimuth angle $\theta_2$ with respect to monochromatic light with a wavelength λ,
said first and second wave plate being laminated together in such a way that directions of optical axes of said plates intersect each other;
characterized in that
said phase difference α is multiple-order 180°, and said phase difference β is multiple-order 270°, and
said azimuth angle $\theta_1$ and said azimuth angle $\theta_2$ satisfy:

$\theta_1=7°±5°$ $\theta_2=52°±5°$.

9. The laminated wave plate according to claim 8, wherein said phase difference α is seventh-order 180°, and said phase difference β is first-order 270°.

10. The laminated wave plate according to claim 8 or 9, wherein said laminated wave plate functions as a quarter-wave plate with respect to light with wavelength of 655 nm and function as a half-wave plate with respect to light with wavelength of 785 nm.

11. A laminated wave plate comprising:
a first wave plate with a phase difference a and an azimuth angle $\theta_1$ with respect to monochromatic light with a wavelength λ, and
a second wave plate with a phase difference β and an azimuth angle $\theta_2$ with respect to monocrhomatic light with a wavelength λ,
said first and second wave plate being laminated to each other in such a way that directions of optical axes of said plates intersect each other;
characterized in that
said phase difference α is a multiple-order 180°, and said phase difference β is multiple-order 180°, and
said azimuth angle $\theta_1$ and said azimuth angle $\theta_2$ satisfy:

$\theta_1=12°±5°$ $\theta_2=57°±5°$.

12. The laminated wave plate according to claim 11, wherein said phase differenceα is seventh-order 180°, and said phase difference β is third-order 180°.

13. The laminated wave plate according to claim 11 or 12, wherein said laminated wave plate functions as a half-wave plate with respect to light with wavelength of 655 nm and function as a 2/2-wave plate with respect to light with wavelength of 785 nm.

14. An optical pickup constructed in such a way that a first linearly polarized light with a first wavelength and a second linearly polarized light with a second wavelength pass through a wave plate, characterized in that said wave plate is the wave plate according to any one of claims 1 to 3, 5 and 6, 8 and 9.

15. An optical pickup constructed in such a way that a first linearly polarized light with a first wavelength and a second linearly polarized light with a second wavelength pass through a wave plate, characterized in that said wave plate is the wave plate according to claim 4.

16. An optical pickup constructed in such a way that a first linearly polarized light with a first wavelength and a second linearly polarized light with a second wavelength pass through a wave plate, characterized in that said wave plate is the wave plate according to claim 7.

17. An optical pickup constructed in such a way that a first linearly polarized light with a first wavelength and a second linearly polarized light with a second wavelength pass through a wave plate, characterized in that said wave plate is the wave plate according to claim 10.

18. An optical pickup constructed in such a way that a first linearly polarized light with a first wavelength and a second linearly polarized light with a second wavelength pass through a wave plate, characterized in that said wave plate is the wave plate according to claim 13.

* * * * *